United States Patent
Gavini et al.

(10) Patent No.: US 8,484,287 B2
(45) Date of Patent: Jul. 9, 2013

(54) SYSTEMS AND METHODS FOR COOKIE PROXY JAR MANAGEMENT ACROSS CORES IN A MULTI-CORE SYSTEM

(75) Inventors: Anil Kumar Gavini, Bangalore (IN); Akshat Choudhary, Bangalore (IN); Puneet Agarwal, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 349 days.

(21) Appl. No.: 12/851,449

(22) Filed: Aug. 5, 2010

(65) Prior Publication Data
US 2012/0036178 A1 Feb. 9, 2012

(51) Int. Cl.
*G06F 15/16* (2006.01)

(52) U.S. Cl.
USPC ........... 709/203; 709/225; 709/228; 709/217; 709/229; 726/12; 726/3

(58) Field of Classification Search
USPC ........................................................ 709/203
See application file for complete search history.

(56) References Cited

U.S. PATENT DOCUMENTS

| | | | |
|---|---|---|---|
| 7,433,956 B2 * | 10/2008 | Zhao et al. | 709/228 |
| 2004/0039822 A1 | 2/2004 | Bensimon | |
| 2004/0073629 A1 * | 4/2004 | Bazot et al. | 709/217 |
| 2005/0251856 A1 * | 11/2005 | Araujo et al. | 726/12 |
| 2005/0262357 A1 | 11/2005 | Araujo et al. | |
| 2006/0112174 A1 | 5/2006 | L'Heureux et al. | |
| 2008/0028440 A1 * | 1/2008 | Basol et al. | 726/3 |
| 2009/0106349 A1 * | 4/2009 | Harris | 709/203 |
| 2009/0193129 A1 | 7/2009 | Agarwal et al. | |
| 2010/0153568 A1 * | 6/2010 | Uola et al. | 709/229 |
| 2011/0153822 A1 * | 6/2011 | Rajan et al. | 709/225 |

OTHER PUBLICATIONS

International Search Report on PCT/US2011/046172 dated Dec. 7, 2011.
Written Opinion on PCT/US2011/046172 dated Dec. 7, 2011.

* cited by examiner

*Primary Examiner* — Hua Fan
(74) *Attorney, Agent, or Firm* — Foley and Lardner LLP; Christopher J. McKenna

(57) ABSTRACT

The present solution is directed towards systems and methods for managing cookies by a multi-core device. The device is intermediary to a client and one or more servers. A first core of a multi-core device receives a response from a server to a request of the client through a user session. The response comprises a cookie. The first core removes the cookie from the response and stores the cookie in a corresponding storage for the session. The first core forwards the response without the cookie to the client. A second core then receives via a session, a second request from the client. The second core determines the identification of the first core as owner of the session from the second request. The second core then communicates to the first core a third request for cookie information for the session.

20 Claims, 23 Drawing Sheets

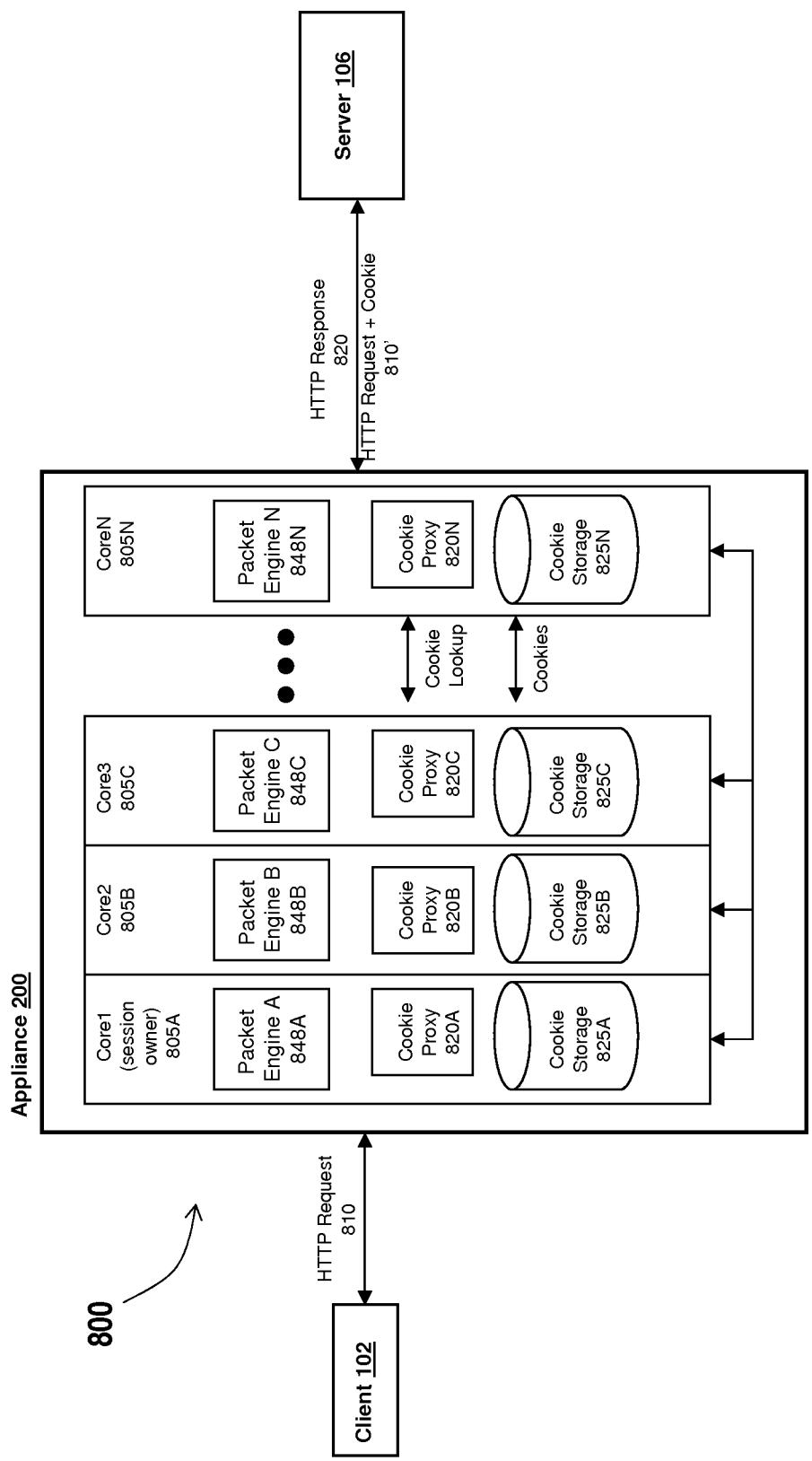

SYSTEMS AND METHODS FOR COOKIE PROXY JAR MANAGEMENT ACROSS CORES IN A MULTI-CORE SYSTEM

FIELD OF THE INVENTION

The present application generally relates to data communication networks. In particular, the present application relates to systems and methods for cookie proxying in a multi-core system.

BACKGROUND OF THE INVENTION

A cookie is a string or text stored by a web browser of a client computer. The cookie can be used for authentication or for storing particular information, such as site preferences and shopping cart content. A cookie, which is also known as a web cookie, browser cookie, or HTTP cookie, generally consists of one or more name-value pairs containing bits of information. Often, the cookies is sent by a server to a web browser executing on a client and then sent back, unchanged by the browser, each time the browser accesses the server.

In some instances, clients connect to servers using secure network connections while other clients may utilize less secure network connections. Additionally, in many network architectures, clients and servers are connected through intermediaries, such as proxies, appliances, firewalls, gateways, and other similar devices. The use of such intermediaries may have a negative affect on the efficiency and efficacy of cookies. Such variations in network configurations and network connections may created challenges for the clients and affect the services provided by the servers.

BRIEF SUMMARY OF THE INVENTION

The present application is directed towards methods and systems for improving cookie operations in a multi-core system. The present application describes methods and systems that improve performance and cookie management in a device with multiple core processors executing in parallel and intercepting HTTP transactions from various clients and servers, often simultaneously.

In one aspect, the present invention is related to a method for managing cookies by a multi-core device. The method includes a device intermediary to a client and one or more servers. A first core of the multi-core device receives via a session, a response from a server to a request of the client. The response comprises a cookie. The first core removes the cookie from the response and stores the cookie in a corresponding storage for the session. The first core then forwards the response without the cookie to the client. A second core of the multi-core device receives, via the session, a second request from the client. The second core determines from the second request identification that the first core is owner of the session. The second core communicates to the first core a third request for cookie information for the session.

In some embodiments, the first core determines to remove the cookie in response to a policy for the session or content of the response. In some embodiments, the first core determines to remove the cookie responsive to identifying a predetermined URL in the response. In some embodiments, the second core receives a session cookie from the client. In some embodiments, the second core determines the owner of the session from the session cookie. In other embodiments, the second core determines the owner of the session for a session identifier. In some embodiments, the second core communicates to the first core the third request for cookie information for the session based on a domain, path and protocol. In some embodiments, the second core receives from the first core, cookie information for a domain, path and protocol. In some embodiments, the second core inserts into the third request a second cookie based on the cookie information received from the first core. In other embodiments, the device forwards to a server of the one or more servers, the third request having the second cookie.

In another aspect, the present invention is related to a system for managing cookies by a multi-core device. The system comprises a multi-core device intermediary to a client and one or more servers. Each core of the multi-core device executes a packet engine. A first core of the multi-core device receives, via a session, a response from a server to a first request of the client. The response comprises a cookie. A first packet engine of the first core removes the cookie from the response, storing the cookie in a corresponding storage for the session, and forwarding the response without the cookie to the client. A second core of the multi-core device receives, via the session, a second request from the client. A second packet engine of the second core determines from the second request, the identity of the first core as owner of the session and communicates to the first core a third request for cookie information for the session.

In some embodiments, the first packet engine removes the cookie in response to a policy for the session or content of the response. In some embodiments, the first packet engine determines to remove the cookie based on identifying a predetermined URL in the response. In some embodiments, the second core receives a session cookie from the client. In some further embodiments, the second packet engine determines the owner of the session from the session cookie. In some further embodiments, the second packet engine determines the owner of the session from a session identifier. In some embodiments, the second packet engine communicates to the first core the third request for cookie information for the session based on a domain, path and protocol. In some embodiments, the second packet engine receives from the first core cookie information for a domain, path and protocol. In some embodiments, the second packet engine inserts into the third request a second cookie based on the cookie information received from the first core. In some embodiments, the second packet engine forwards to a server of the one or more servers, the third request having the second cookie.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIG. 8A is a block diagram representing a system for cookie proxying in a multi-core system.

Figure 1A:
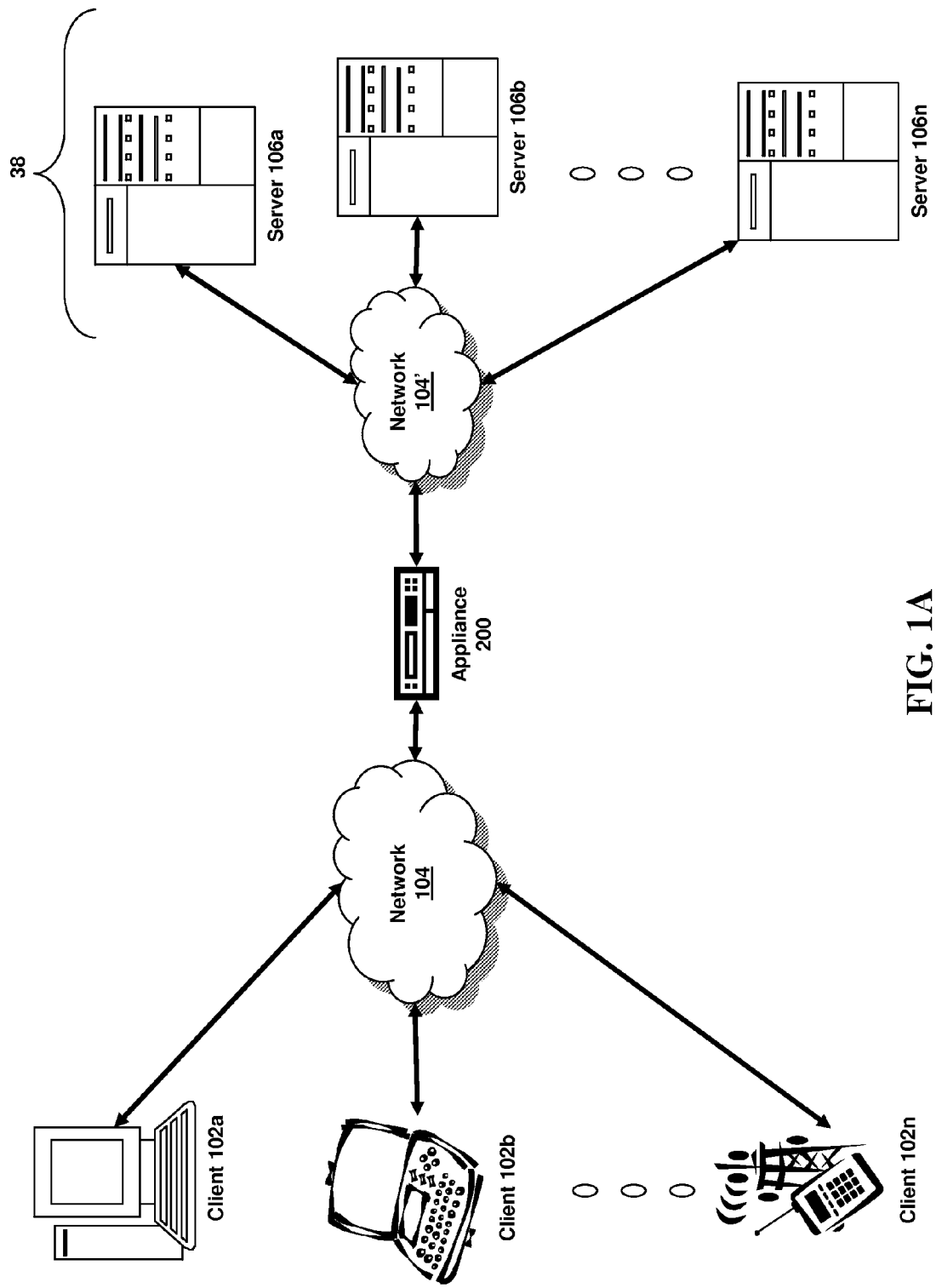
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server;

Section D describes embodiments of systems and methods for virtualizing an application delivery controller;

Section E describes embodiments of systems and methods for providing a multi-core architecture and environment;

Section F describes embodiments of systems and methods for providing cookie proxying and management by an intermediary device; and Section G describes embodiments of systems and methods for providing cookie proxying and management via a multi-core system.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients $102a$-$102n$ (also generally referred to as local machine(s) 102, or client(s) 102) in communication with one or more servers $106a$-$106n$ (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102.

One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
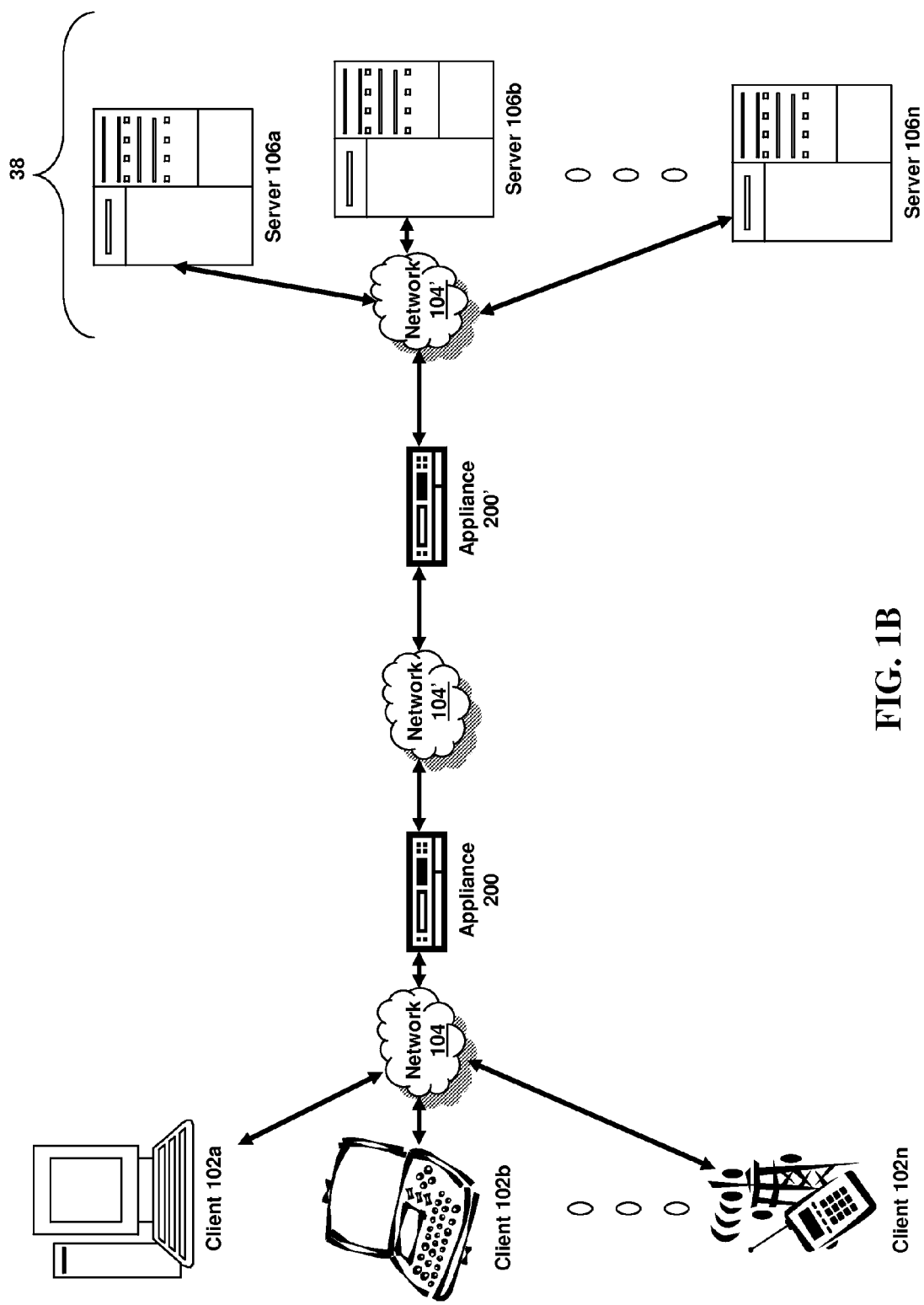
FIG. 1B is a block diagram of an embodiment of an environment for delivering a computing environment from a server to a client via an appliance.
Figure 1C:
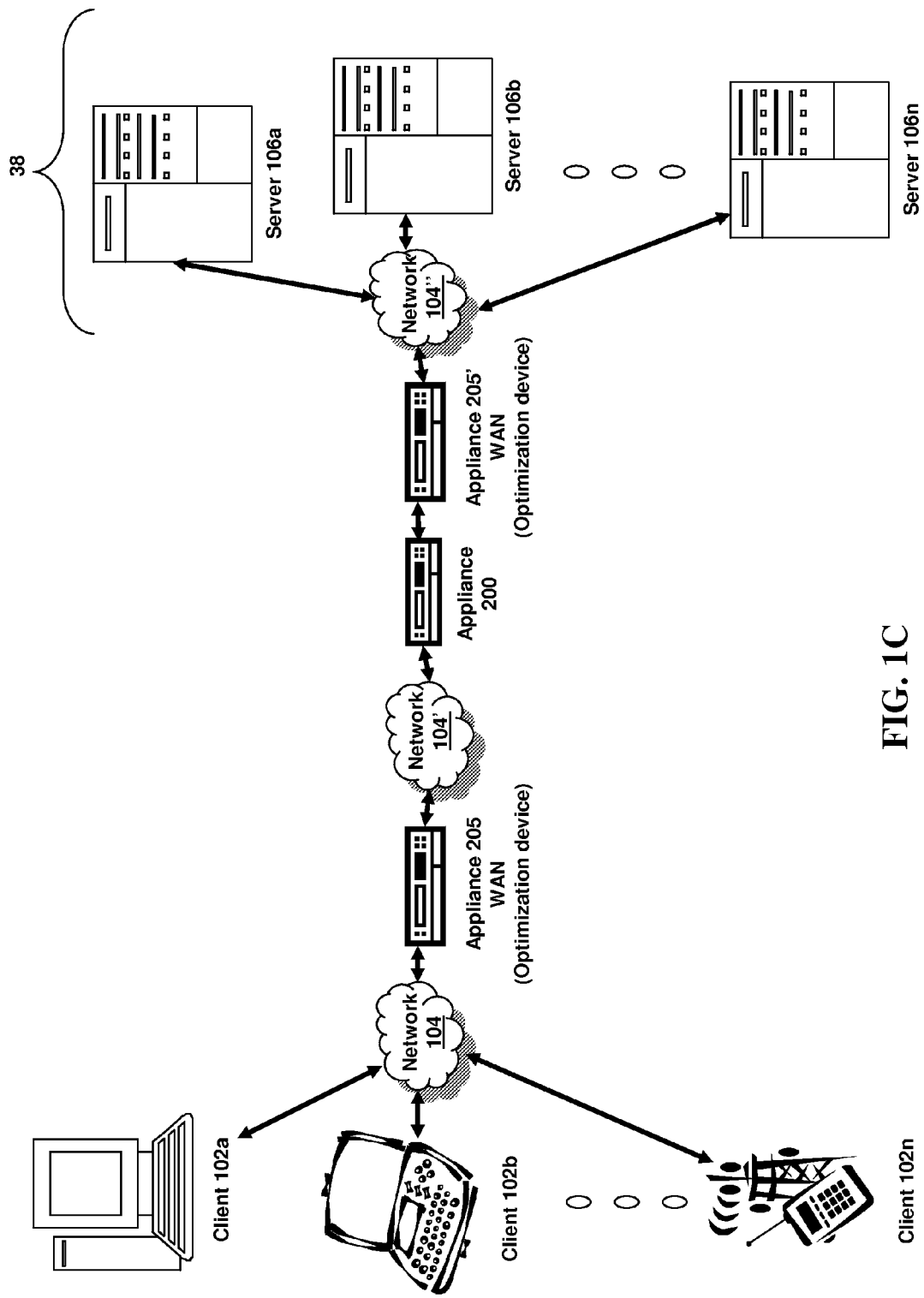
FIG. 1C is a block diagram of another embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and a second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
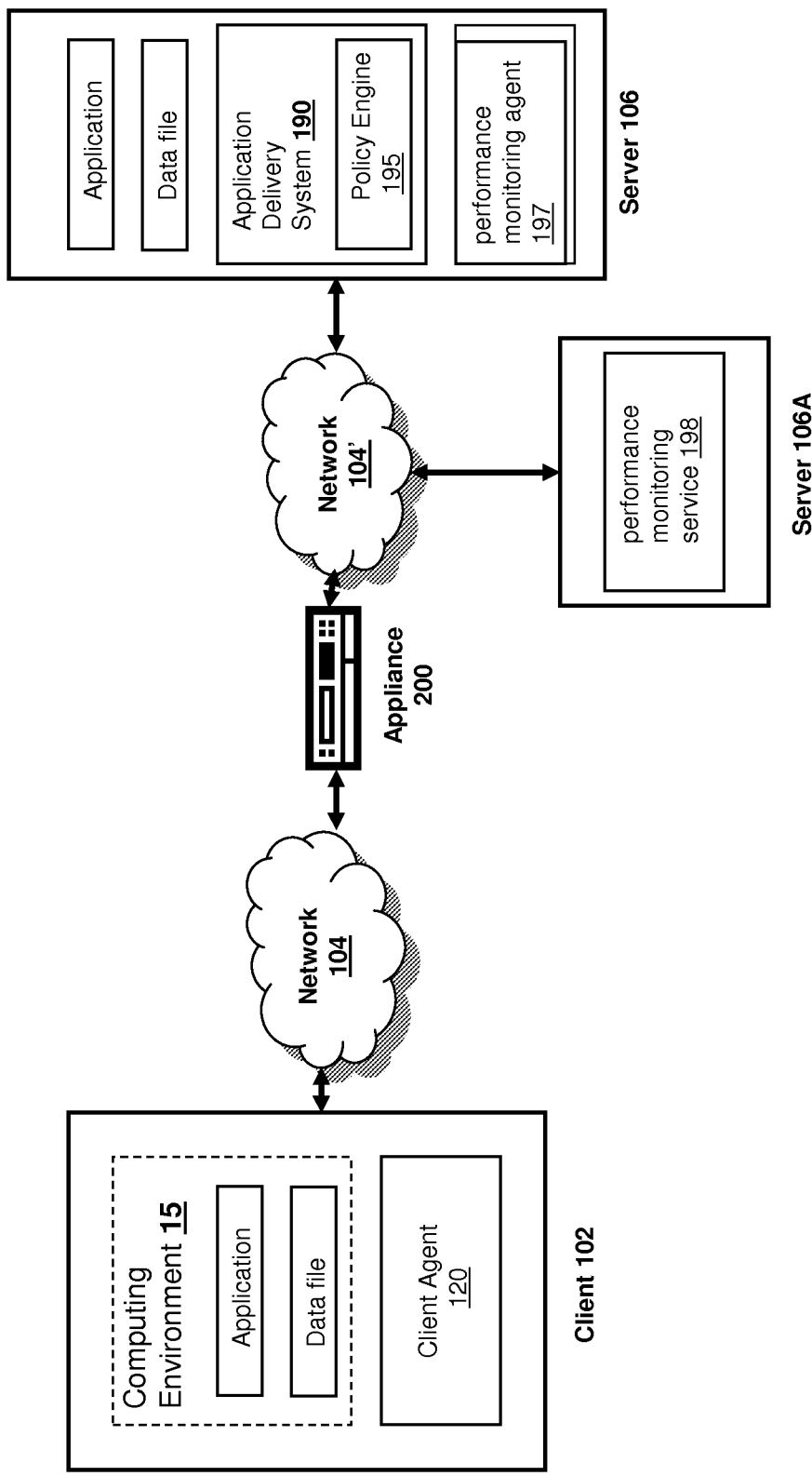
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
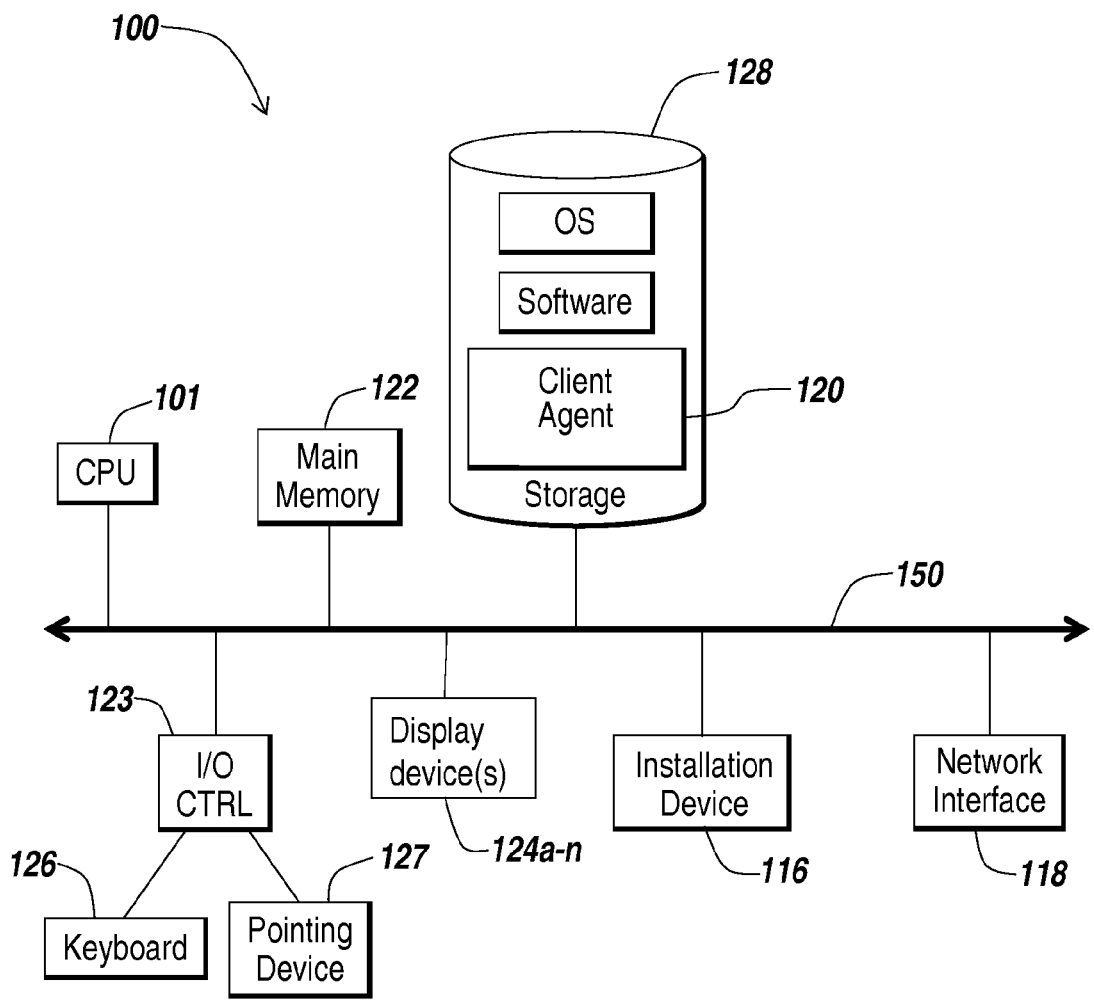
FIGS. 1E-1H are block diagrams of embodiments of a computing device.
Figure 1F:
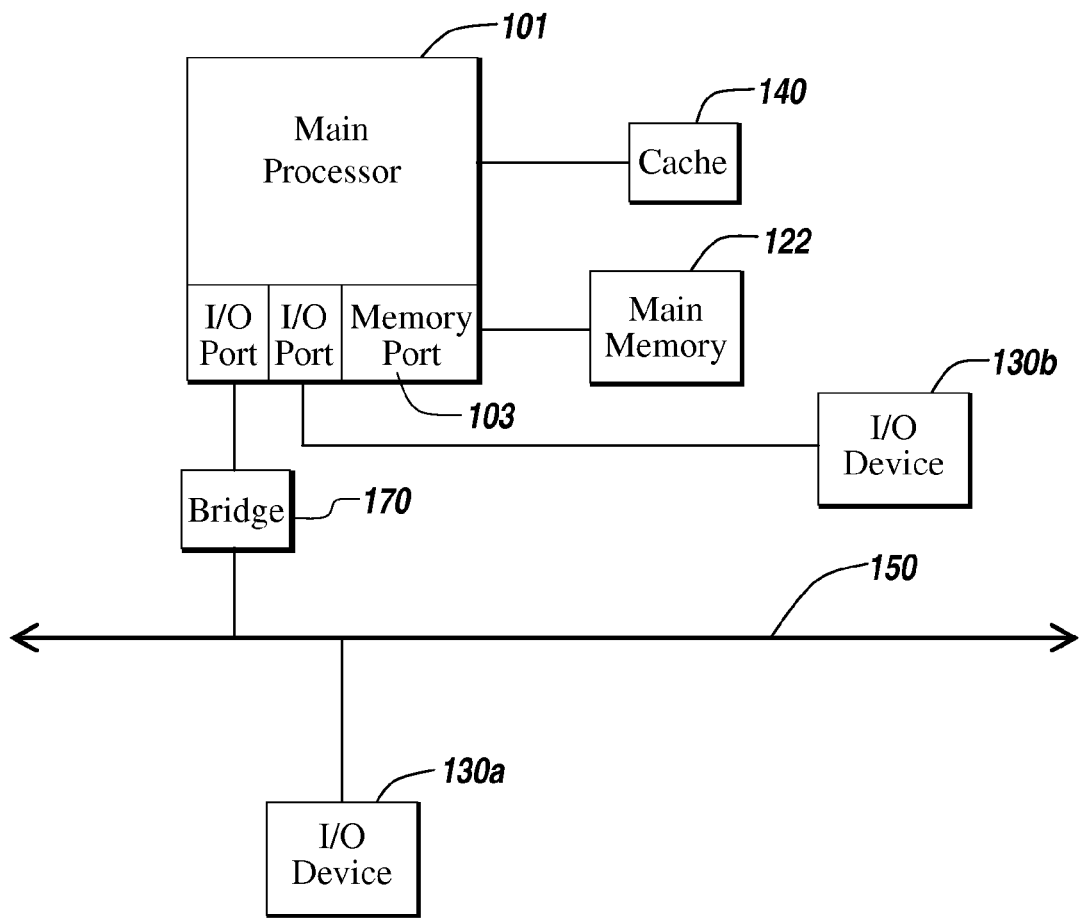

The client 102, server 106, and appliance 200 may be deployed as and/or executed on any type and form of computing device, such as a computer, network device or appliance capable of communicating on any type and form of network and performing the operations described herein. FIGD. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1F depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1F, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130b via HyperTransport, Rapid I/O, or InfiniBand. FIG. 1F also depicts an embodiment in which local busses and direct communication are mixed: the processor 101 communicates with I/O device 130b using a local interconnect bus while communicating with I/O device 130a directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
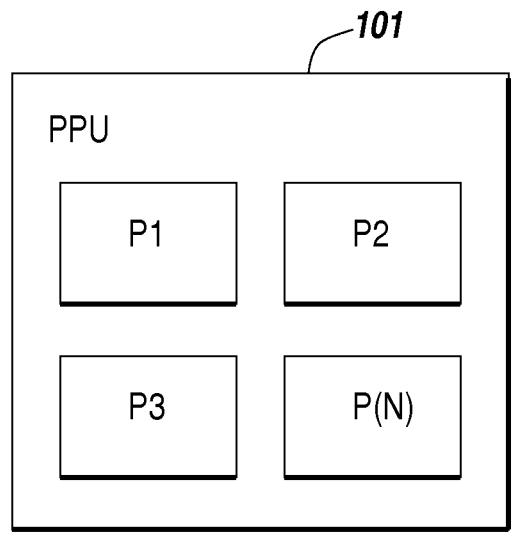

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
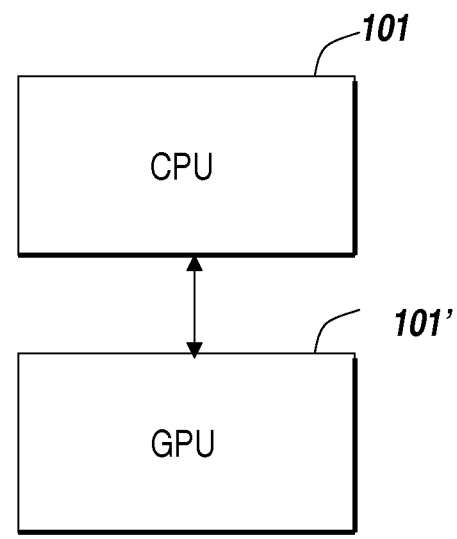

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100*a* executes an application on behalf of a user of a client computing device 100*b*. In other embodiments, a computing device 100*a* executes a virtual machine, which provides an execution session within which applications execute on behalf of a user or a client computing devices 100*b*. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
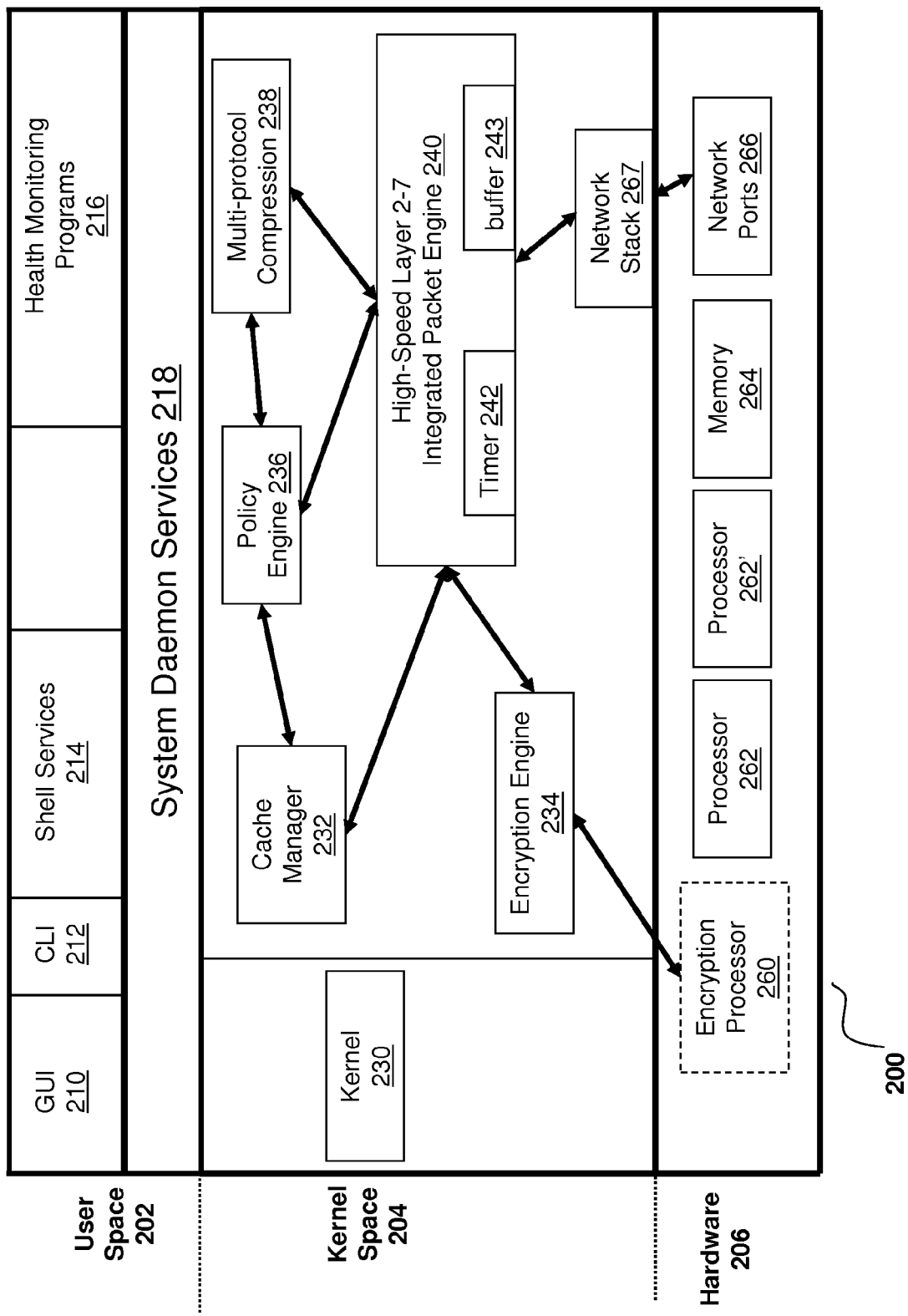
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
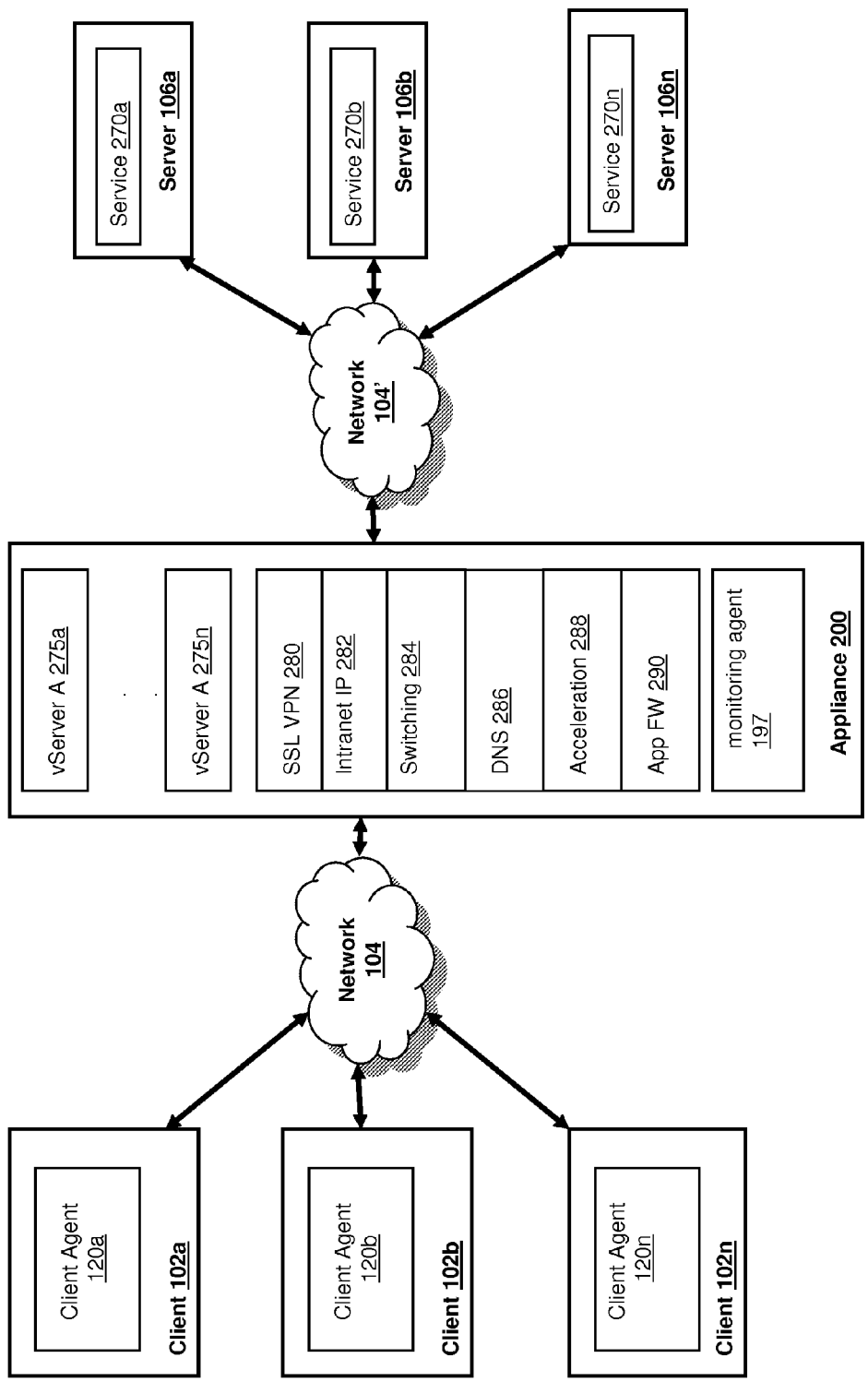
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a vServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102 In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a
TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or IntranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP address 282, which is a network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement numbers expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
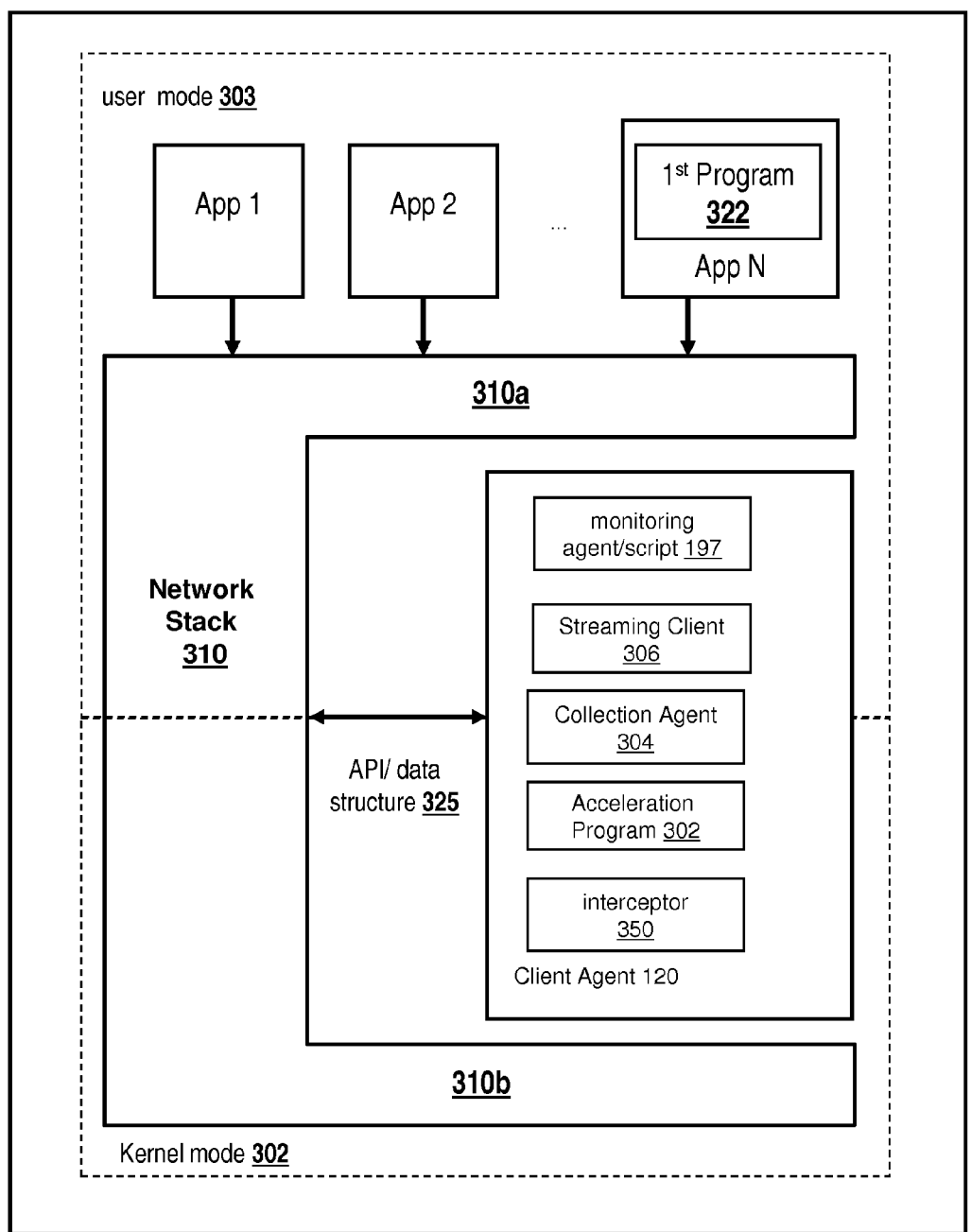
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310*a*-310*b*. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 302 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/ scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol. The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 197 monitors and measures performance of any portion of the client agent 120. For example, in some embodiments, the monitoring agent 197 monitors and measures performance of the acceleration program 302. In another embodiment, the monitoring agent 197 monitors and measures performance of the streaming client 306. In other embodiments, the monitoring agent 197 monitors and measures performance of the collection agent 304. In still another embodiment, the monitoring agent 197 monitors and measures performance of the interceptor 350. In some embodiments, the monitoring agent 197 monitors and measures any resource of the client 102, such as memory, CPU and disk.

The monitoring agent 197 may monitor and measure performance of any application of the client. In one embodiment, the monitoring agent 197 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4A:
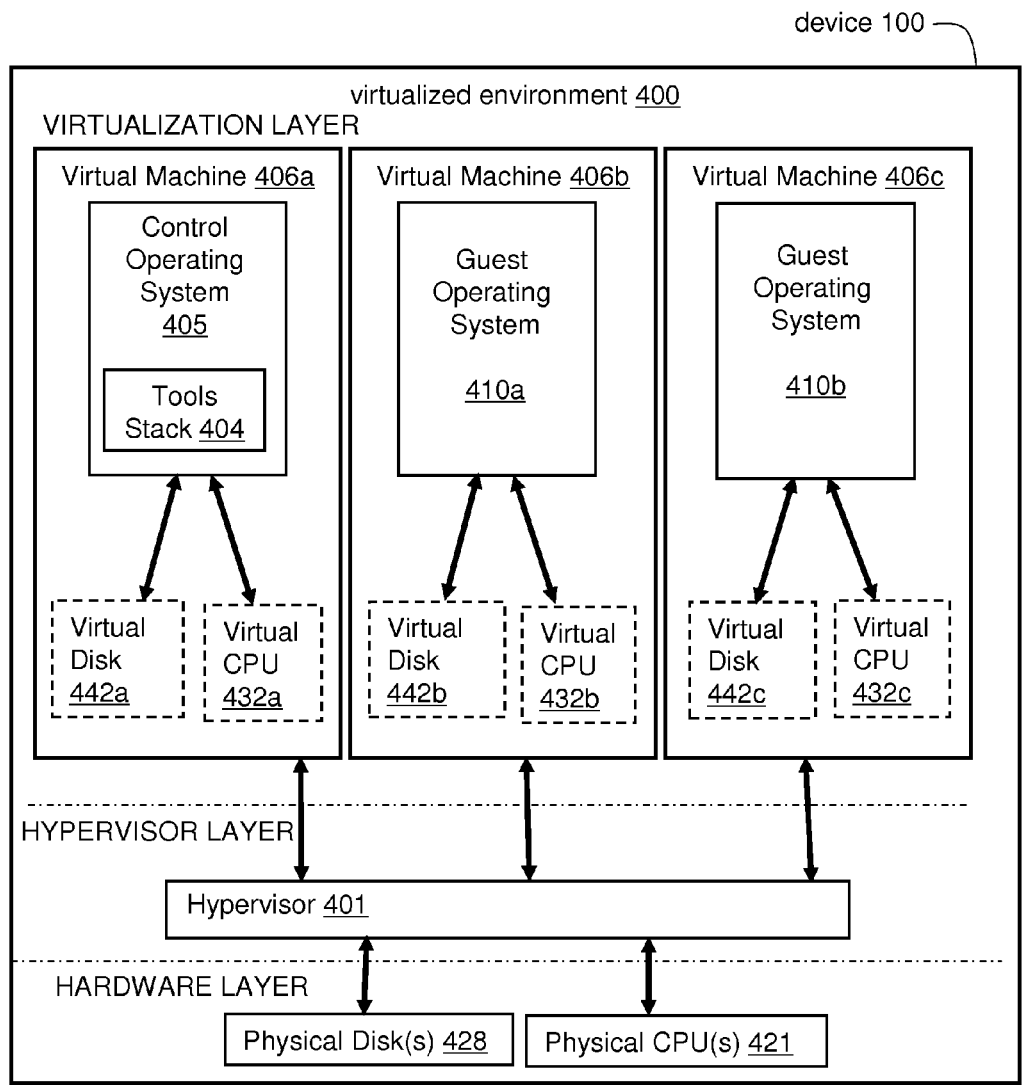
FIG. 4A is a block diagram of an embodiment of a virtualization environment.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442) as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406a-c (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405a on a computing device 100a may exchange data with a control operating system 405b on a computing device 100b, via communications between a hypervisor 401a and a hypervisor 401b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100*b*), or managing virtual machines 406*b*, 406*c* on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 404.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4B:
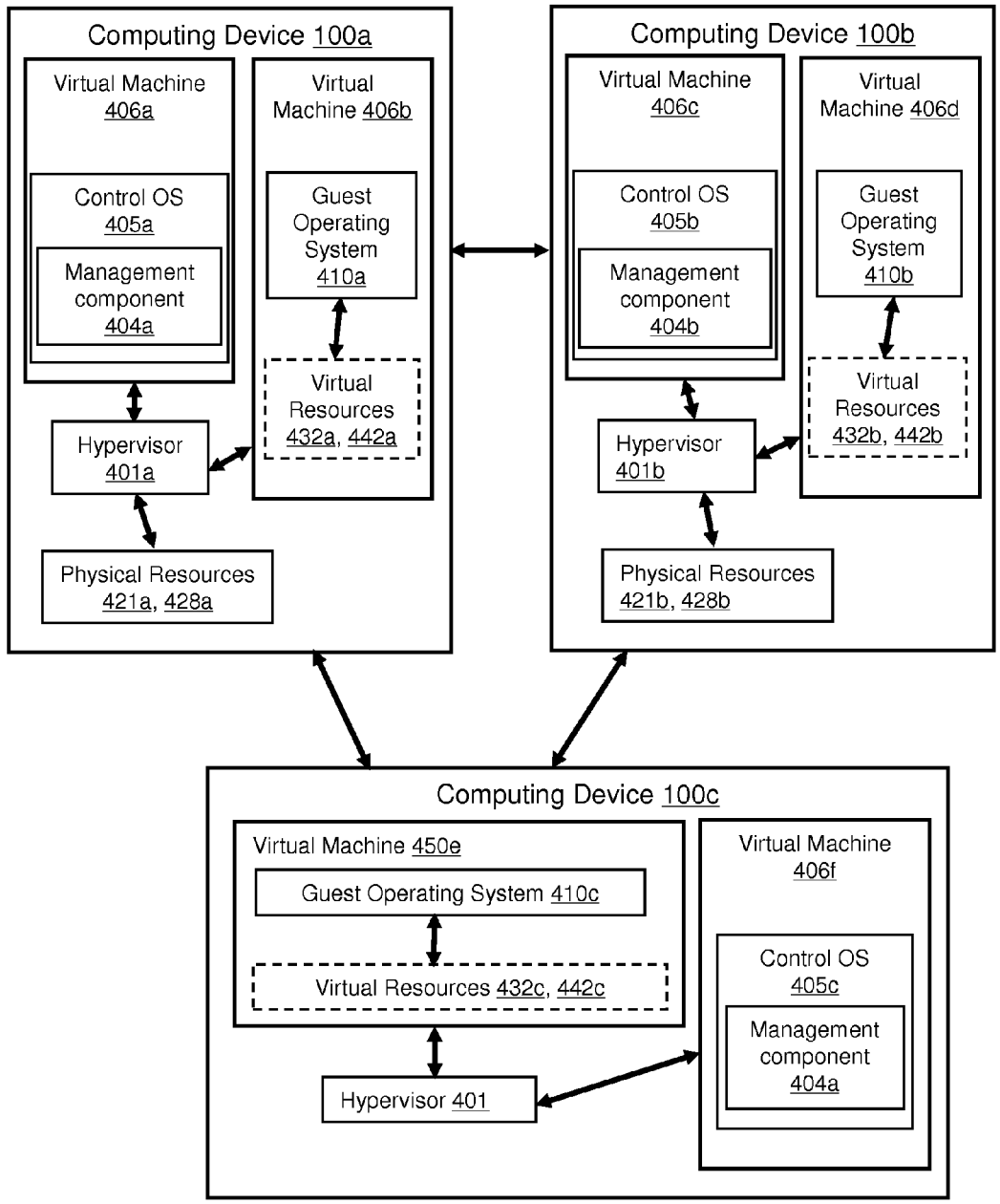
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to variously as tools stacks 404 or management components 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404*a* is referred to as a pool management component 404*a*. In another embodiment, a management operating system 405*a*, which may be referred to as a control operating system 405*a*, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406*b* from one physical machine 100 to another. In further embodiments, the management component 404*a* identifies a computing device 100*b* on which to execute a requested virtual machine 406*d* and instructs the hypervisor 401*b* on the identified computing device 100*b* to execute the identified virtual machine; such a management component may be referred to as a pool management component.

Figure 4C:
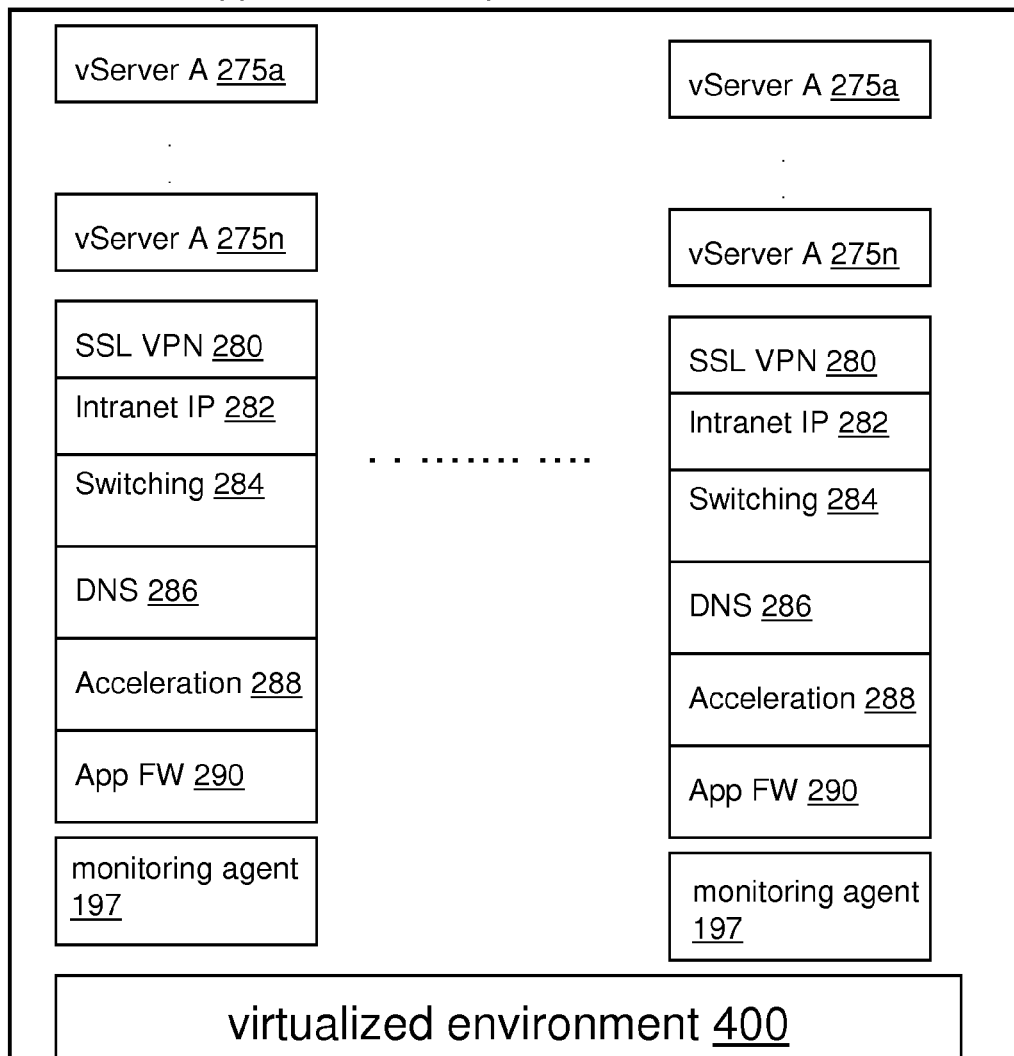
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIGS. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing a Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7× increase in performance and scalability.

Figure 5A:
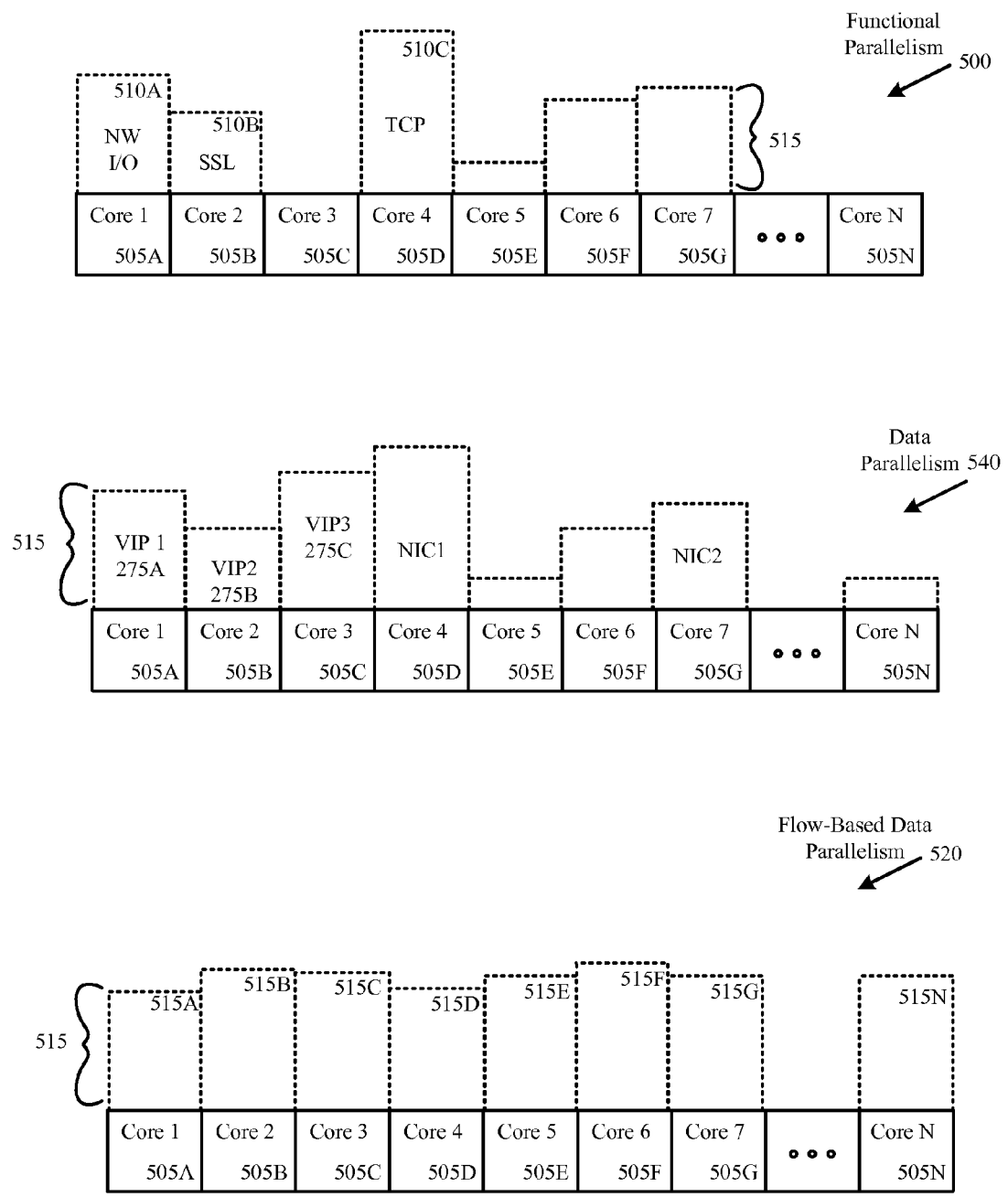
FIG. 5A are block diagrams of embodiments of approaches to implementing parallelism in a multi-core system.

Illustrated in FIG. 5A are some embodiments of work, task, load or network traffic distribution across one or more processor cores according to a type of parallelism or parallel computing scheme, such as functional parallelism, data parallelism or flow-based data parallelism. In brief overview, FIG. 5A illustrates embodiments of a multi-core system such as an appliance 200' with n-cores, a total of cores numbers 1 through N. In one embodiment, work, load or network traffic can be distributed among a first core 505A, a second core 505B, a third core 505C, a fourth core 505D, a fifth core 505E, a sixth core 505F, a seventh core 505G, and so on such that distribution is across all or two or more of the n cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level 515 across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

In further detail to FIG. 5A, in some embodiments, load, work or network traffic can be distributed among cores 505 according to functional parallelism 500. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism 500, can comprise distributing network traffic according to a particular function such as network input/output management (NW I/O) 510A, secure sockets layer (SSL) encryption and decryption 510B and transmission control protocol (TCP) functions 510C. This may lead to a work, performance or computing load 515 based on a volume or level of functionality being used. In some embodiments, distributing work across the cores 505 according to data parallelism 540, can comprise distributing an amount of work 515 based on distributing data associated with a particular hardware or software component. In some embodiments, distributing work across the cores 505 according to flow-based data parallelism 520, can comprise distributing data based on a context or flow such that the amount of work 515A-N on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A, division by function may lead to different cores running at different levels of performance or load 515.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A division by function may lead to different cores running at different levels of load or performance.

Figure 5B:
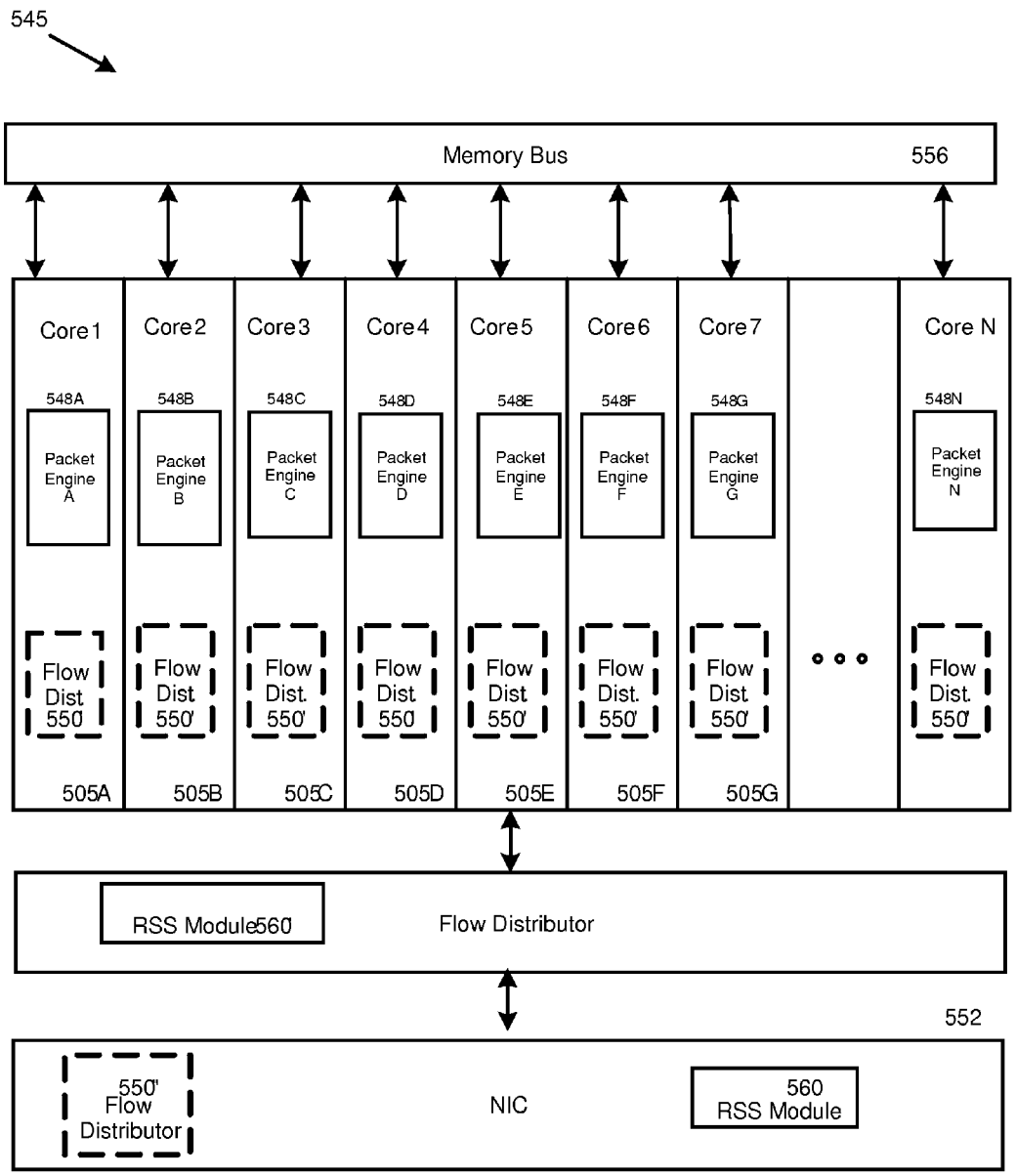
FIG. 5B is a block diagram of an embodiment of a system utilizing a multi-core system.

The functionality or tasks may be distributed in any arrangement and scheme. For example, FIG. 5B illustrates a first core, Core 1 505A, processing applications and processes associated with network I/O functionality 510A. Network traffic associated with network I/O, in some embodiments, can be associated with a particular port number. Thus, outgoing and incoming packets having a port destination associated with NW I/O 510A will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

While FIG. 5A illustrates functions such as network I/O, SSL and TCP, other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism 540. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) 542D-E and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load 515.

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

While FIG. 5A illustrates a single vServer associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In one embodiment, a single NIC can be associated with a single core 505, as is the case with NIC1 542D and NIC2 542E. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores as illustrated by the varying loads 515 of FIG. 5A.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism 520, distribution of data is related to any type of flow of data, such as request/response pairings, transactions, sessions, connections or application communications. For example, network traffic between a client and a server traversing the appliance may be distributed to and processed by one core of the plurality of cores. In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In one embodiment, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load 515A on Core 1 505A may be comprised of the network traffic associated with the transactions between the particular client and server. Allocating the network traffic to Core 1 505A can be accomplished by routing all data packets originating from either the particular client or server to Core 1 505A.

While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load 515A on Core 1 is less than the load 515B-N on the rest of the cores 505B-N. Once the first data packet is allocated to Core 1 505A, the amount of load 515A on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load 515A-N distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes illustrated in FIG. 5A can be combined in any manner to generate a hybrid parallelism or distributed processing scheme that encompasses function parallelism 500, data parallelism 540, flow-based data parallelism 520 or any portions thereof. In some cases, the multi-core system may use any type and form of load balancing schemes to distribute load among the one or more cores 505. The load balancing scheme may be used in any combination with any of the functional and data parallelism schemes or combinations thereof.

Illustrated in FIG. 5B is an embodiment of a multi-core system 545, which may be any type and form of one or more systems, appliances, devices or components. This system 545, in some embodiments, can be included within an appliance 200 having one or more processing cores 505A-N. The system 545 can further include one or more packet engines (PE) or packet processing engines (PPE) 548A-N communicating with a memory bus 556. The memory bus may be used to communicate with the one or more processing cores 505A-N. Also included within the system 545 can be one or more network interface cards (NIC) 552 and a flow distributor 550 which can further communicate with the one or more processing cores 505A-N. The flow distributor 550 can comprise a Receive Side Scaler (RSS) or Receive Side Scaling (RSS) module 560.

Further referring to FIG. 5B, and in more detail, in one embodiment the packet engine(s) 548A-N can comprise any portion of the appliance 200 described herein, such as any portion of the appliance described in FIGS. 2A and 2B. The packet engine(s) 548A-N can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus 556 or the one of more cores 505A-N. In some embodiments, the packet engine(s) 548A-N can comprise one or more vServers 275A-N, or any portion thereof. In other embodiments, the packet engine(s) 548A-N can provide any combination of the following functionalities: SSL VPN 280; Intranet UP 282; switching 284; DNS 286; packet acceleration 288; App FW 280; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) 548A-N can, in some embodiments, be associated with a particular server, user, client or network. When a packet engine 548 becomes associated with a particular entity, that packet engine 548 can process data packets associated with that entity. For example, should a packet engine 548 be associated with a first user, that packet engine 548 will process and operate on packets generated by the first user, or packets having a destination address associated with the first user. Similarly, the packet engine 548 may choose not to be associated with a particular entity such that the packet engine 548 can process and otherwise operate on any data packets not generated by that entity or destined for that entity.

In some instances, the packet engine(s) 548A-N can be configured to carry out the any of the functional and/or data parallelism schemes illustrated in FIG. 5A. In these instances, the packet engine(s) 548A-N can distribute functions or data among the processing cores 505A-N so that the distribution is according to the parallelism or distribution scheme. In some embodiments, a single packet engine(s) 548A-N carries out a load balancing scheme, while in other embodiments one or more packet engine(s) 548A-N carry out a load balancing scheme. Each core 505A-N, in one embodiment, can be associated with a particular packet engine 548 such that load balancing can be carried out by the packet engine. Load balancing may in this embodiment, require that each packet engine 548A-N associated with a core 505 communicate with the other packet engines associated with cores so that the packet engines 548A-N can collectively determine where to distribute load. One embodiment of this process can include an arbiter that receives votes from each packet engine for load. The arbiter can distribute load to each packet engine 548A-N based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof.

In some embodiments the memory bus 556 can be any type and form of memory or computer bus. While a single memory bus 556 is depicted in FIG. 5B, the system 545 can comprise any number of memory buses 556. In one embodiment, each packet engine 548 can be associated with one or more individual memory buses 556.

The NIC 552 can in some embodiments be any of the network interface cards or mechanisms described herein. The NIC 552 can have any number of ports. The NIC can be designed and constructed to connect to any type and form of network 104. While a single NIC 552 is illustrated, the system 545 can comprise any number of NICs 552. In some embodiments, each core 505A-N can be associated with one or more single NICs 552. Thus, each core 505 can be associated with a single NIC 552 dedicated to a particular core 505.

The cores 505A-N can comprise any of the processors described herein. Further, the cores 505A-N can be configured according to any of the core 505 configurations described herein. Still further, the cores 505A-N can have any of the core 505 functionalities described herein. While FIG. 5B illustrates seven cores 505A-G, any number of cores 505 can be included within the system 545. In particular, the system 545 can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Further referring to FIG. 5B, any of the functionality and/or embodiments of the cores 505 described above in connection with FIG. 5A can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In one embodiment, the cores 505 may be any type and form of processor. In some embodiments, a core can function substantially similar to any processor or central processing unit described herein. In some embodiment, the cores 505 may comprise any portion of any processor described herein. While FIG. 5A illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s) 200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (not shown) can facilitate communication between each core 505.

In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In one embodiment, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor 550 can be any application, program, library, script, task, service, process or any type and form of executable instructions executing on any type and form of hardware. In some embodiments, the flow distributor 550 may any design and construction of circuitry to perform any of the operations and functions described herein. In some embodiments, the flow distributor distribute, forwards, routes, controls and/ors manage the distribution of data packets among the cores 505 and/or packet engine or VIPs running on the cores. The flow distributor 550, in some embodiments, can be referred to as an interface master. In one embodiment, the flow distributor 550 comprises a set of executable instructions executing on a core or processor of the appliance 200. In another embodiment, the flow distributor 550 comprises a set of executable instructions executing on a computing machine in communication with the appliance 200. In some embodiments, the flow distributor 550 comprises a set of executable instructions executing on a NIC, such as firmware. In still other embodiments, the flow distributor 550 comprises any combination of software and hardware to distribute data packets among cores or processors. In one embodiment, the flow distributor 550 executes on at least one of the cores 505A-N, while in other embodiments a separate flow distributor 550 assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system 545 comprises one or more flow distributors 550, each flow distributor 550 can be associated with a processor 505 or a packet engine 548. The flow distributors 550 can comprise an interface mechanism that allows each flow distributor 550 to communicate with the other flow distributors 550 executing within the system 545. In one instance, the one or more flow distributors 550 can determine how to balance load by communicating with each other. This process can operate substantially similarly to the process described above for submitting votes to an arbiter which then determines which flow distributor 550 should receive the load. In other embodiments, a first flow distributor 550' can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor 550 can distribute network traffic among the cores 505 according to a distribution, computing or load balancing scheme such as those described herein. In one embodiment, the flow distributor can distribute network traffic according to any one of a functional parallelism distribution scheme 550, a data parallelism load distribution scheme 540, a flow-based data parallelism distribution scheme 520, or any combination of these distribution scheme or any load balancing scheme for distributing load among multiple processors. The flow distributor 550 can therefore act as a load distributor by taking in data packets and distributing them across the processors according to an operative load balancing or distribution scheme. In one embodiment, the flow distributor 550 can comprise one or more operations, functions or logic to determine how to distribute packers, work or load accordingly. In still other embodiments, the flow distributor 550 can comprise one or more sub operations, functions or logic that can identify a source address and a destination address associated with a data packet, and distribute packets accordingly.

In some embodiments, the flow distributor 550 can comprise a receive-side scaling (RSS) network driver, module 560 or any type and form of executable instructions which distribute data packets among the one or more cores 505. The RSS module 560 can comprise any combination of hardware and software, In some embodiments, the RSS module 560 works in conjunction with the flow distributor 550 to distribute data packets across the cores 505A-N or among multiple processors in a multi-processor network. The RSS module 560 can execute within the NIC 552 in some embodiments, and in other embodiments can execute on any one of the cores 505.

In some embodiments, the RSS module 560 uses the MICROSOFT receive-side-scaling (RSS) scheme. In one embodiment, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module 560 can apply any type and form hash function such as the Toeplitz hash function. The hash function may be applied to the hash type or any the sequence of values. The hash function may be a secure hash of any security level or is otherwise cryptographically secure. The hash function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined based on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:

- 4-tuple of source TCP Port, source IP version 4 (IPv4) address, destination TCP Port, and destination IPv4 address.
- 4-tuple of source TCP Port, source IP version 6 (IPv6) address, destination TCP Port, and destination IPv6 address.
- 2-tuple of source IPv4 address, and destination IPv4 address.
- 2-tuple of source IPv6 address, and destination IPv6 address.
- 2-tuple of source IPv6 address, and destination IPv6 address, including support for parsing IPv6 extension headers.

The hash result or any portion thereof may used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. Any portion of the hash result or the hast result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system 575 does not include a RSS driver or RSS module 560. In some of these embodiments, a software steering module (not shown) or a software embodiment of the RSS module within the system can operate in conjunction with or as part of the flow distributor 550 to steer packets to cores 505 within the multi-core system 575.

The flow distributor 550, in some embodiments, executes within any module or program on the appliance 200, on any one of the cores 505 and on any one of the devices or components included within the multi-core system 575. In some embodiments, the flow distributor 550' can execute on the first core 505A, while in other embodiments the flow distributor core 550" can execute on the NIC 552. In still other embodiments, an instance of the flow distributor 550' can execute on each core 505 included in the multi-core system 575. In this embodiment, each instance of the flow distributor 550' can communicate with other instances of the flow distributor 550' to forward packets back and forth across the cores 505. There exist situations where a response to a request packet may not be processed by the same core, i.e. the first core processes the request while the second core processes the response. In these situations, the instances of the flow distributor 550' can intercept the packet and forward it to the desired or correct core 505, i.e. a flow distributor instance 550' can forward the response to the first core. Multiple instances of the flow distributor 550' can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

Although FIG. 5B illustrates the flow distributor 550 as executing within the multi-core system 575, in some embodiments the flow distributor 550 can execute on a computing device or appliance remotely located from the multi-core system 575. In such an embodiment, the flow distributor 550 can communicate with the multi-core system 575 to take in data packets and distribute the packets across the one or more cores 505. The flow distributor 550 can, in one embodiment, receive data packets destined for the appliance 200, apply a distribution scheme to the received data packets and distribute the data packets to the one or more cores 505 of the multi-core system 575. In one embodiment, the flow distributor 550 can be included in a router or other appliance such that the router can target particular cores 505 by altering meta data associated with each packet so that each packet is targeted towards a sub-node of the multi-core system 575. In such an embodiment, CISCO's vn-tag mechanism can be used to alter or tag each packet with the appropriate meta data.

Figure 5C:
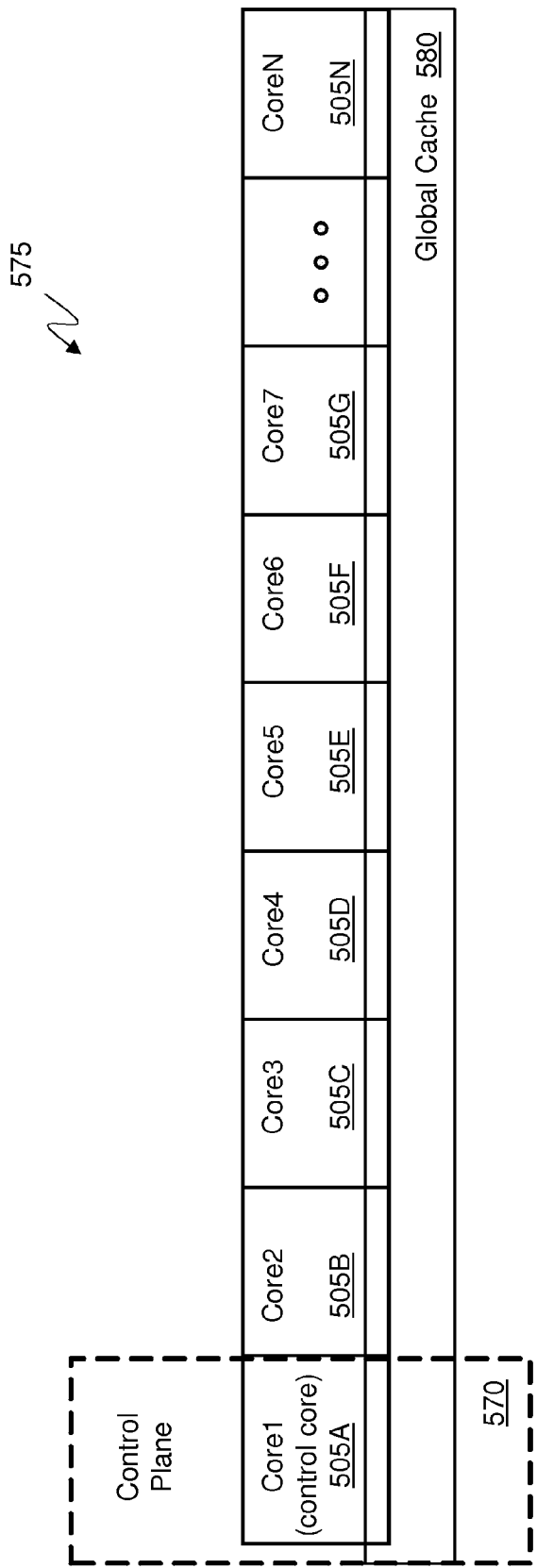
FIG. 5C is a block diagram of another embodiment of an aspect of a multi-core system.

Illustrated in FIG. 5C is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5C, and in more detail, the cores 505A-N as well as the control core 505A can be any processor described herein. Furthermore, the cores 505A-N and the control core 505A can be any processor able to function within the system 575 described in FIG. 5C. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575). The global cache 580 can be allocated from that predetermined amount of memory while the rest of the available memory can be allocated among the cores 505. In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In one embodiment, the control core 505A can receive a greater amount of available cache, while the other cores 505 can receiving varying amounts or access to the global cache 580.

In some embodiments, the system 575 can comprise a control core 505A. While FIG. 5C illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plan 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

F. Systems and Methods for Cookie Proxying by an Intermediary Device

Cookies may be used for maintaining a state of a system or a memory of a previous event, transaction or communication between two entities on a network. In some cases, cookies may be utilized for various types of session tracking. Cookie management may be referred to as a feature of a network device, such as an intermediary 200, and may provide a way to manage a server 102 or a client 106 in creating, utilizing or controlling cookies transmitted between the server 106 and the client 102. Embodiments of the intermediary described herein provide ways to manage cookies for the client and the server. In some embodiments, the intermediary manages server consumed cookies on the server-side while not sending cookies to the client browser.

Figure 6A:
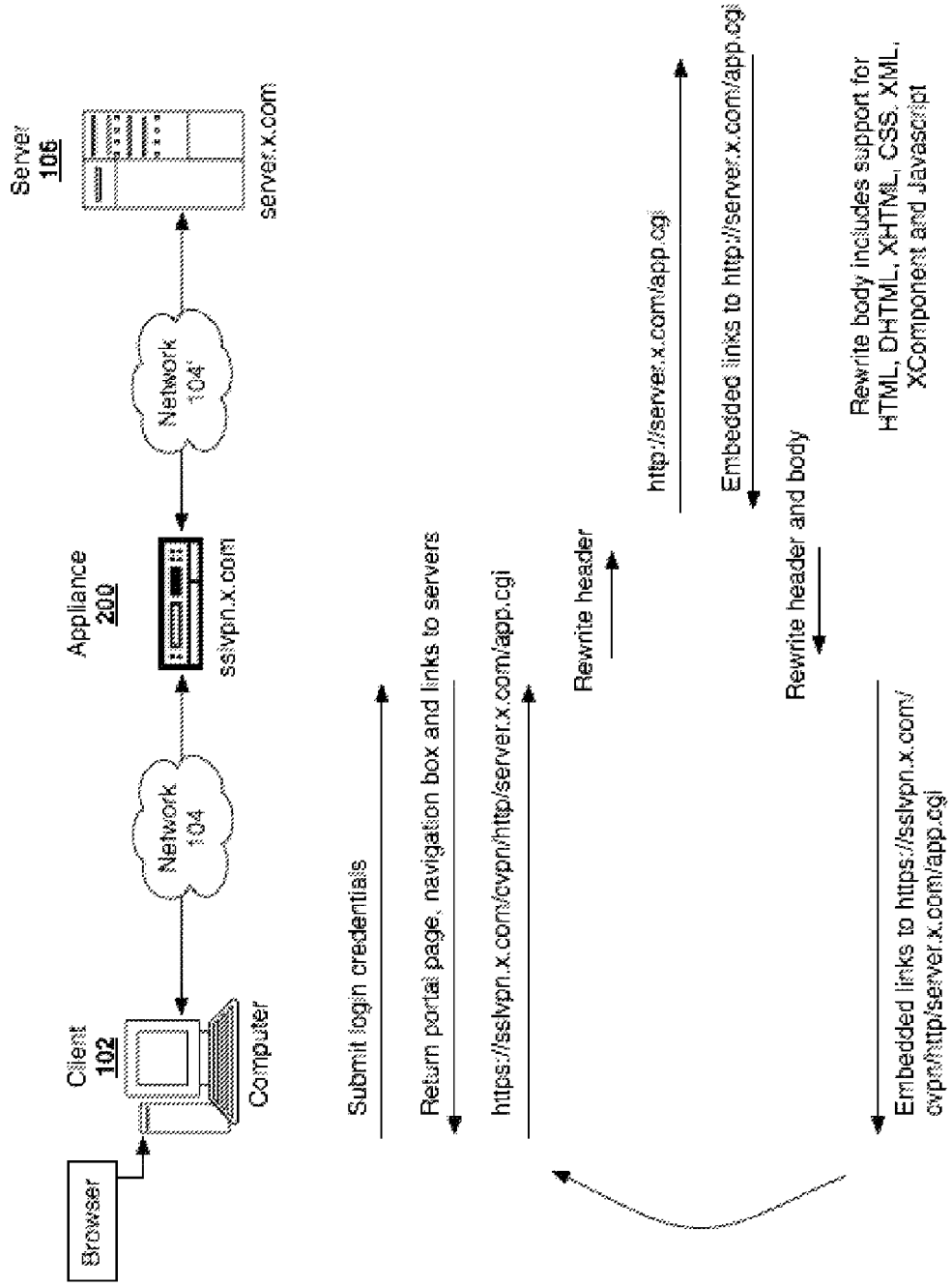
FIG. 6A is a block diagram of an embodiment of a clientless virtual private network access to a server via the intermediary.

Referring now to FIG. 6A, an embodiment of a clientless virtual private network (VPN) environment for accessing a server via an appliance 200 or proxy is depicted. In brief overview, the client 102 operates on computing device 100 and executes a browser operated by a user. The client 102 may be on a first network 104, such as a public network. A user on the client 102 may request via the browser access to a resource on a second network 104', such as a private network of an enterprise. The appliance 200 provides the user a clientless VPN access to the requested resource. The client may not install, execute or otherwise any agent, component, program, driver or application that is constructed and/or designed to provide VPN connectivity (referred to as client based VPN) to the network 104'. Instead, the appliance or proxy may rewrite responses from the server and requests from the client to provide VPN functionality without the user of a VPN agent operating on the client. For example, the appliance may rewrite Uniform Resource Locators (URLs) between the client and server, such as URLs in any content server by the server or requests transmitted by the client. The appliance 200 may rewrite URLs between the client and the server in a manner transparent and seamless to either or both of the client and the server. As such, the client, browser or server and server application do not need to have knowledge or be aware of the clientless SSL VPN access scenario.

The appliance 200 may provide via an SSL VPN 280 module, previously described herein, a facility for accessing a resource. In one embodiment, the appliance 200 provides a client based access to a network by providing, installing or executing an SSL VPN agent on the client 102 for communicating with the appliance 200. In some embodiments, the appliance 200 provides for clientless SSL VPN access to a resource, such as an http/https/file share, without having to download an SSL VPN client or agent to the client 102. For example, a user may want to access the resources within company from an outside machine such at a kiosk on which he does not have privilege to install the client or does not want to go through the client installation process. The clientless SSL VPN feature is also useful when the SSL VPN client is not supported for the device (e.g. new PDA in market) but the device run an SSL enabled browser. In other embodiments, the appliance 200 chooses for a user between client-based and clientless SSL VPN access to the resource based on policy and any policy rules, actions and/or conditions.

The client may include any type and form of user agent which may be a browser, editor, spider (web-traversing robots), or any other end user tool or program. The client 102 may include any type and form of browser. In one embodiment, the browser is any version of Internet Explorer manufactured by Microsoft Corporation of Redmond, Wash. In another embodiment, the browser is any version of the Netscape browser manufactured by the Netscape Communications Corporation. In other embodiments, the browser is any version of the open source browser referred to as Firefox and provided by Mozilla Foundation of California and found at www.mozilla.com. In yet another embodiment, the browser is any version of the browser referred to as Opera manufactured by Opera Software ASA of Oslo, Norway. In some embodiments, the client 102 executes or includes any type and form of application or program for displaying web pages, web content, HTML, XML, CSS (Cascading Style Sheets), JavaScript or HTTP content.

In operation of the embodiment depicted by FIG. 6A, a user logs in at the SSL VPN site provided by the appliance 200, such at a domain name and IP address hosted by the appliance 200. For example, the user via a browser of the client 102, may select or enter a URL to the SSL VPN site. The appliance 200 may authenticate the user and may further determine authorization of the user to access the appliance 200 or the SSL VPN site. After successful authentication, the appliance serves a portal page to the client to display to the user via the browser. The portal page may include a navigation box, such as a set of one or more user interface elements for a user to select to operate or run an application. The portal page may include links to other pages or URLs to which the user may have access. The URLs or links on the portal page may reference or identify the host name or IP address of the SSL VPN site provided by the appliance 200.

The user via the portal page may select one or more URLs, for example, by clicking on an active hyperlink or URL. In response, the browser or client transmits a request to the domain hosted by the appliance 200. For example, as depicted in FIG. 6A, the user may request an application of the server 106 via the appliance: "https://sslvpn.x.com/cvpn/http/server.x.com/app.cgi". In some embodiments, the user sends another request, such as for example "https://proxy.x.com/cvpn/http/server.x.com/app.cgi". The appliance 200 receives the request from the client 102 and rewrites the request to transmit to the server. For example, as depicted in FIG. 6A, the appliance may remove or strip the domain name hosted by the appliance such as "sslvpn.x.com" or "proxy.x.com" and forward the remaining portion of the request to the server 106.

In response to the request, the server serves content to the client. The content or body of the response may include embedded links or URLs to other pages of the server or to other servers on the network 104', such as embedded links to "http://server.x.com/app.cgi". The appliance rewrites the header and body to modify any URLs to reference the domain name or IP address of the SSL VPN site so that any further URL or link selection via the browser of the client communicates requests to the appliance 200. The appliance communicates the modified content to the client 102. The appliance 200, such as via the AppFw 290, sometimes referred to as AppSecure module 290, may be designed and constructed to rewrite URLs of requests and responses based on policy of a policy engine. The links (URLs) in that page and other pages received subsequently from the server during this SSL VPN session are modified by the appliance in such a way that the links point to the SSL VPN site (VPN VIP 275) and the original request URL (absolute or relative) is encoded within that request URL.

Figure 6B:
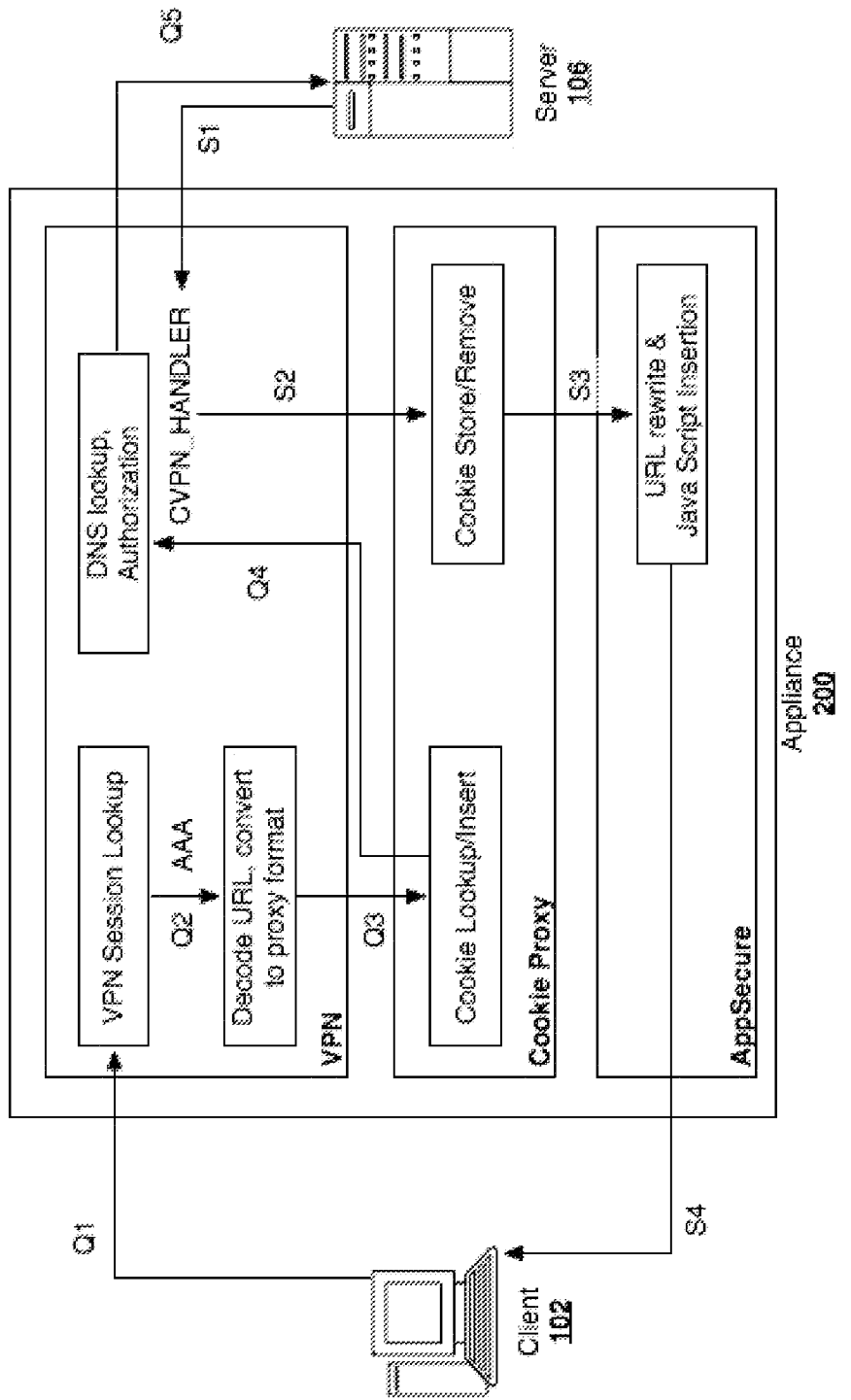
FIG. 6B is a block diagram of another embodiment of a clientless virtual private network access to a server via the intermediary.

Referring now to FIG. 6B, another embodiment of a VPN environment for providing VPN access as well as cookie management is depicted. In brief overview, the appliance 200 may include a VPN module 280 for handling any of the SSL VPN functionality, clientless and/or client based, as described herein. The appliance and/or VPN module 280 may have an AAA module to perform any type and form of authentication, authorization and auditing (AAA) and/or to track and manage VPN session information. The AAA module may also perform any type and form of VPN session look to determine the VPN session for any client request. The VPN module may also perform an URL decoding and covert the URL to server format, such as to submit to a server on the private network. VPN module 280 also includes DNS lookup functionality and authorization via VPN handler function, logic or operation.

The appliance may include a cookie proxy or cookie manager for storing, tracking and managing cookies between the client and the server. The cookie may include cookie storage, referred to as a cookie jar for adding or inserting cookies as well as removing cookies. The cookie manager or proxy may include functions, logic or operations to store and look up cookie information in a cookie jar by URL, domain name or other information of the request and/or response. In some embodiments, the appliance 200 manages cookies on the behalf of clients that do not support cookies, disabled cookies or for cases where it may be desired or preferred not to send cookies to the client.

The appliance may also include an AppFW 280 also referred to as AppSecure in the context of an appliance manufactured by Citrix Systems, Inc. The AppSecure 280 module may include logic, functions or operations for perform any type and form of content rewriting, such as URL rewriting. In some embodiments, the AppSecure 280 module performs any type and form of content injection into a request and/or response between a client and a server. In one embodiment, the AppSecure module 280 injects scripts into a response to the client, such as a JavaScript, to perform any type and form of desired functionality.

Any of the components of the appliance 200 used for clientless SSL VPN access may be responsive to or driven by configuration, such as via any one or more policies of the policy engine. The policies may direct and determine the type and form of URL encoding and decoding performed by the VPN module. In some embodiments, the policies may direct and determine how and when the cookie proxy manages and proxies cookies. In other embodiments, the policies may direct and determine how and when the AppSecure module performs URL rewriting and/or content injection. The policies may direct the way a user access the private network and applications on the private networks. Policies may be configured based on access scenarios, which can include access based on any combination of a user, type and form of client, type and form of network, type of resources accessed, types of applications used, temporal information as well as any information that may be determined by the appliance via network traffic traversing thereto.

With reference to FIG. 6B, a flow of packets via the appliance 200 for clientless SSL VPN access is discussed. In response to a successful login request, the VPN appliance may send a portal page to the sender of the login request. The portal page may have one or more links in "vpn encoded form" as described in connection with FIG. 6A. The portal page flows through the response code path described below. When a user clicks on any of the URLs in the portal page, the packet flow may be implemented in a number of ways and using a number of steps. In some embodiments, for request path at step Q1, the appliance 200 may receive a URL request and look up the VPN session in the AAA module. At step Q2, the appliance may decode the VPN encoded URL to the expected URL for the server or the network 104'. The appliance may also modify the header of the request, such as the header values, to server format, or a format intended for transmission and use by the server 106, such as the HTTP server for example. The appliance may reparse the header so that any other modules of the appliance see the request in the server format. At step Q3 in the request path, the appliance via the cookie manager or proxy may look up the cookie for the request based on the domain and path of the URL. In some cases, if the request should include a cookie, the appliance may insert the cookie from a cookie jar. At step Q4, the appliance may resolve the domain name of the server present in the URL into an IP address of the server via a DNS lookup function/module of the appliance. The appliance may create server information based on the DNS lookup in the AAA module. In addition, authorization policies may be evaluated to determine if the request may be transmitted to the server. At step Q5 the appliance may send the request to the server. In some embodiments, the appliance sends the request to the server provided that the authorization is successful.

In the response path from the server to the client via the appliance, at step S1, the appliance may receive the response from the server. The VPN module 280 may process the response. The VPN module may pass the response header to the cookie proxy module and the response body to the AppSecure module. At step S2, the cookie proxy may remove cookies from the header of the response that are not configured or otherwise identified as client consumed cookies and store them in a cookie jar used for the current session. At step S3, the AppSecure module may rewrite any URL in "vpn encoded form" as per rewrite policies. The AppSecure module may also insert into the response body any scripts, such as JavaScript code to be executed at client side. At step S4, the appliance may send the modified response to the client. In many embodiments, any of the Q or S steps happen in any order or in any combination with any other steps or embodiments described herein.

Cookies may be used for maintaining a state of a system or a memory of a previous event, transaction or communication between two entities on a network. In some cases, cookies may be utilized for various types of session tracking. Cookie management may be referred to as a feature of a network device, such as an intermediary 200, and may provide a way to manage a server 102 or a client 106 in creating, utilizing or controlling cookies transmitted between the server 106 and the client 102. Embodiments of the intermediary described herein provide ways to manage cookies for the client and the server. In some embodiments, the intermediary manages server consumed cookies on the server-side while not sending cookies to the client browser.

Figure 7A:
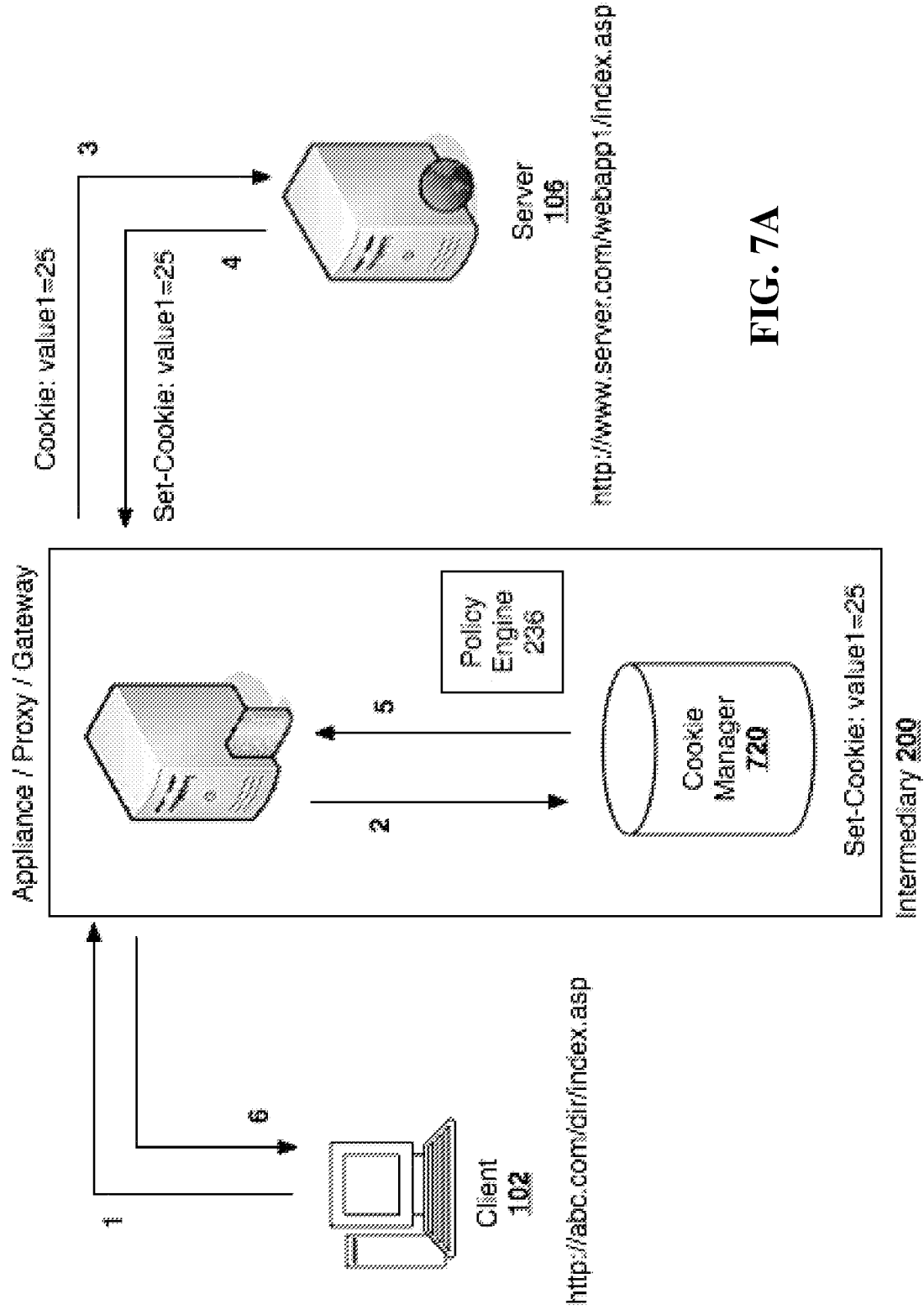
FIG. 7A is a block diagram relating a number of embodiments of cookie management.
Figure 7B:
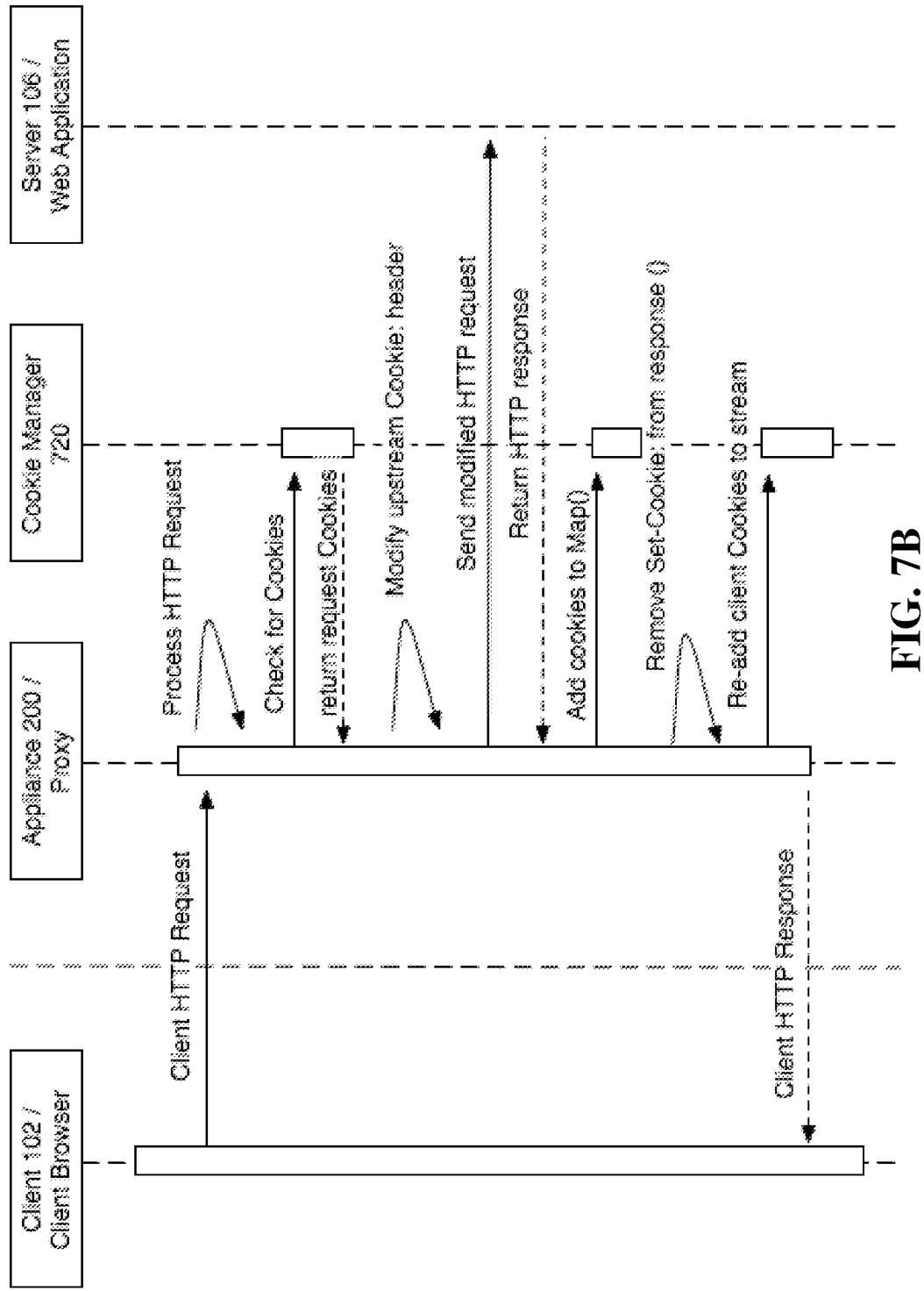
FIG. 7B is a block diagram presenting a number of management sequence diagrams utilized in cookie management.
Figure 7C:
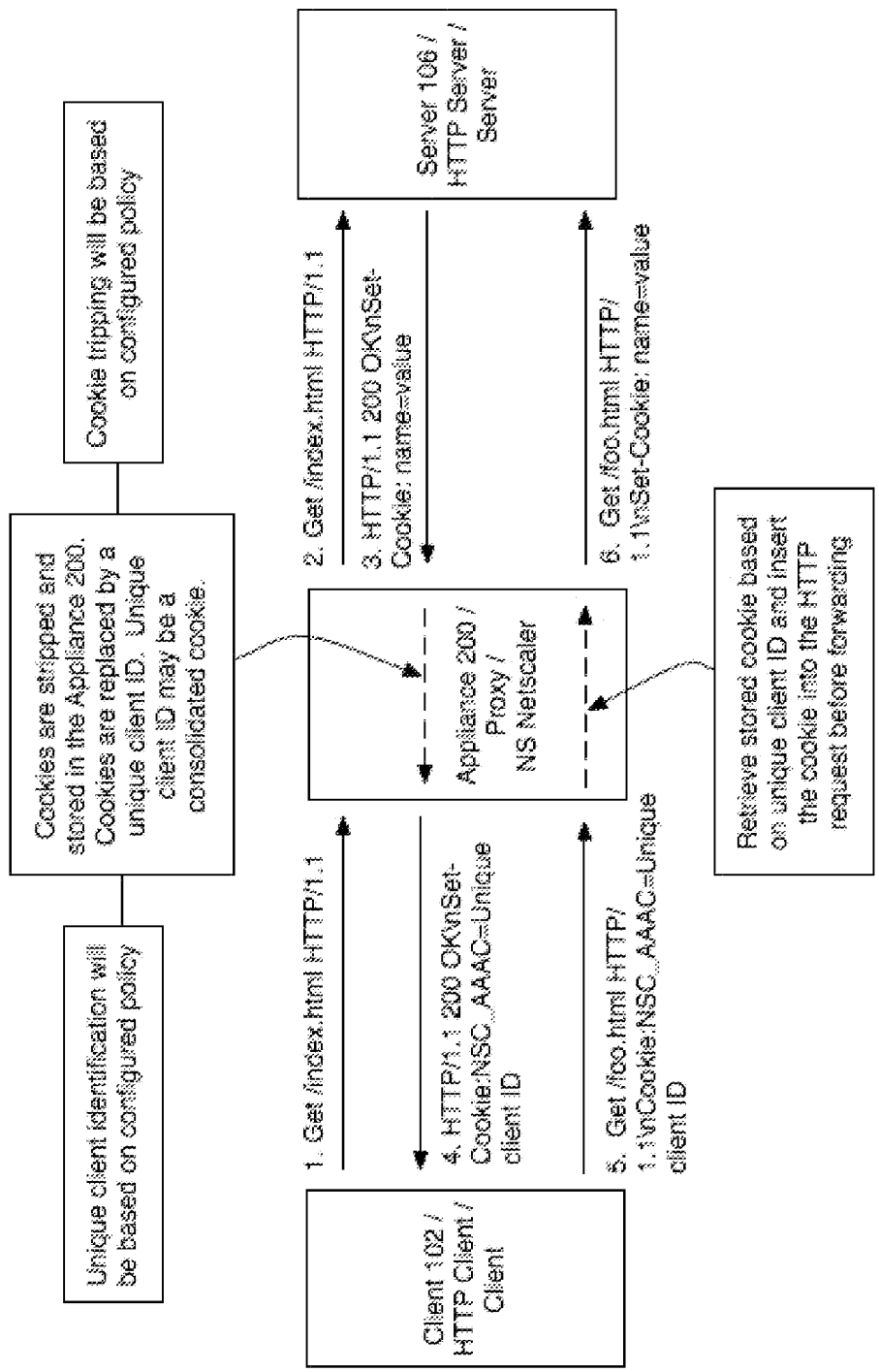
FIG. 7C is a block diagram presenting a number of embodiments of cookie proxy data flow, including the methods relating to cookie proxying.

Systems and methods for cookie proxying are illustrated by FIG. 7A, FIG. 7B and FIG. 7C. FIG. 7A depicts an embodiment of a system and a method for managing cookies in an embodiment of a clientless SSL VPN environment. FIG. 7B illustrates sequence diagrams and steps of an embodiment of a method for cookie management that includes a SSL VPN clientless access scenario. FIG. 7C depicts embodiments for cookie proxying by an intermediary that utilizes a unique identifier, such as a unique client ID. These illustrations may relate to a number of embodiments of systems and methods for implementing cookie management, such as a clientless cookie management.

Clientless cookie management may enable a web client that resides within an unsecured network to access a web application hosted behind a secured network without compromising the security of the secured network. For example, clientless cookie management may improve security for the transmitted information by removing server consumed cookie data. Clientless cookie management may disable the server consumed cookie data from being transmitted to the client and prevent accessibility to any sensitive information which may be included in the cookie. In addition, clientless cookie management may enable web browsers that do not support cookies, such as PDAs and WAP browsers to work with web applications on the servers that require cookies. Furthermore, in instances when web applications used are not compatible with cookie path rewriting, clientless cookie management may provide a service allowing such applications to function by rewriting the cookie path.

Referring now to FIG. 7A, an embodiment of a system and method for implementing SSL VPN clientless cookie management via an intermediary 200 is illustrated. FIG. 7A depicts a client 102 communicating with a server 106 via an intermediary 200. The intermediary 200 includes a policy engine 236 and a cookie manager 720. Client 102 transmits a request, such as an HTTP (hypertext transfer protocol) request intended for the server 106 to the intermediary 200. The request includes a URL (uniform resource locator) which may identify a service or a resource stored on or otherwise available from a server 106. Cookie manager 720 receives the request and generates a cookie associated with the client 102 using the policy engine 236. The generated cookie may satisfy any preferences or configurations of the server 106, thus enabling the initially cookie-less request to be accepted and processed by the server 106. Cookie manager 720 modifies the request to include the cookie forwards the modified request to the server 106. Server 106 issues a response to the request and transmits the response to the intermediary 200 using the cookie generated by the cookie manager 720. Cookie manager 720 modifies the response by removing the cookie. The modified response is then transmitted to the client 102. The server 106 and client 102 may further transmit additional requests and responses using the cookie, thus allowing the cookie-less client 102 to access the resources on the cookie-configured server 106.

A cookie manager 720 may be any device, component, unit, function or an apparatus generating, terminating, modifying or managing cookies. Cookie manager 720 may also modify requests of the clients 102 and responses of the servers 106. Cookie manager 720 may comprise hardware, software, or any combination of hardware and software components to manage and control cookies. A cookie manager 720 may comprise logic, control functions, processing circuitry, software programs, algorithms and scripts to control, manage or modify transmission between the clients 102 and servers 106. In a number of embodiments, cookie manager 720 comprises policies utilized during the process of managing cookies and providing the control of communications between the client 102 and the server 106.

In some embodiments, cookie manager 720 may uniquely identify a user on a network, for example by providing a unique identifier using a configured policy, such as a policy of a policy engine 236. Unique identifier may be any number, value or a set of data, numbers or characters uniquely identifying a client 102, a server 106 or an appliance 200 on the network. In some embodiments, cookie manager 720 may utilize the unique identifier to associate a received response from the server 106 with the specific client 102 to which the response is intended. Cookie manager 720 may include any functionality to modify the response using the cookies and client identifiers such that the client 102 receives the response in a desired format. Similarly, cookie manager 720 may include any functionality to modify the request of a specific client 102 to include a specific cookie to access a resource on the server 106 using the client unique identifier and the cookie generated for the client.

Cookie manager 720 may modify or change any transmission sent by a server 106 or a client 102. In some embodiments, cookie manager 720 modifies transmissions between the client 102 and server 106 using one or more policies for handling cookies of a policy engine 236. Cookie manager 720 may modify the transmissions to include or exclude the cookies and unique client identifiers. In some embodiments, cookie manager 720 generates cookies for any client 102 requesting access to any servers 106. Cookie manager 720 may generate the cookie for the clients 102 in response to a policy. In some embodiments, cookie manager may determine that a particular client should not be allowed a cookie in response to a policy. In other embodiments, cookie manager 720 determines that a particular unique client identifier should be associated with the client 102 in response to a policy. In further embodiments, cookie manager 720 determines a type and form of the cookie to generate for the request in response to a policy. In yet further embodiments, cookie manager determines if and how will the cookies be stored for the future requests of the client in response to a policy.

In some embodiments, cookie manager eliminates or strips the cookies from the requests or the responses. Cookie manager may assign or reassign cookies to the clients 102 or servers 106. In still further embodiments, cookie manager 720 changes, modifies or rewrite cookies from the requests from the clients 102 or responses from the servers 106. Cookie manager 720 may match a value, a name or a unique client identifier uniquely identifying a client to a cookie or a portion of the cookie associated with a client, a server or an intermediary 200. In some embodiments, cookie manager 720 may add a cookie associated with the unique client identifier to the URL. In further embodiments, cookie manager 720 may remove the unique client identifier and add a cookie associated with the unique client identifier instead. In a number of embodiments, cookie manager 720 may replace a cookie with a unique identifier, sometimes also referred to as a unique ID uniquely identifying a client 102 or a server 106.

The cookie manager 720 may use a parser for parsing the transmissions. Cookie manager 720 may also use an internal map for matching a plurality of unique identifiers relating a plurality of clients, servers or appliances 200 to a plurality of cookies relating the clients, servers or the appliances. For example, the cookie manager 720 may utilize a map comprising a unique identifier associated with one or more cookies for matching a client 102 uniquely identified by the unique identifier with the one or more cookies. In such cases, the cookie manager 720 may modify, change or edit a request from the client or a response to the client using the one or more cookies matched to the unique client identifier. Cookie manager 720 may utilize policies to manage transmissions between a client 102 and a server 106 by managing, adding or removing of the cookies and unique client identifiers to and from the transmissions of the clients 102 and servers 106 as necessary to comply with configurations or preferences of receiving devices, i.e. the clients 102 and servers 106 receiving the transmissions.

A semi-colon client delimited list may be any map, list, database or file comprising a list of cookies along with information associated with clients 102 that communicate with one or more servers 106 via the intermediary 200. Semi-colon client delimited list herein may also be interchangeably referred to as an internal map or a list of cookies or the map. In some embodiments, the semi-colon client delimited list comprises name value pairs of cookies and values or unique identifiers which may be used instead of the cookies for upstream communication, i.e. communication towards the server 106, or downstream communication, i.e. communication towards the client 102. Sometimes, cookie manager 720 may use a semi-colon delimited list of the client consumed cookies and/or the client and server consumed cookies to link, match or associate values or unique identifiers of or more clients 102 to each of the cookies associated with the clients. By using the semi-colon delimited list, the cookie manager 720 may determine which cookies to re-inject, add or include into the downstream or upstream transmission. Cookie manager 720 may use the map or list of cookies to match a cookie from a transmission received by the intermediary 200 to the client 102 to whom the transmission is destined for. The cookie manager 720 may then edit or modify the transmission to exclude the cookie and include any other information associated with the client 102 instead. Similarly, cookie manager 720 may use the map or the list of cookies to match a unique client identifier with a cookie to include into the transmission.

In some instances, by turning on server side cookie management and not specifying the semi-colon delimited list, web applications may function incorrectly. Using the semi-colon delimited list may disable this error which may occur when a cookie manager 720 filters the client consumed cookies at the server 106. Using the semi-colon delimited list may also disable the error which may occur when a web application attempts to access a cookie value on the client 102 resulting in an unexpected behavior. In a number of embodiments, the delimited client cookie list, or the list, may comprise various on/off settings for server side or client side cookie management. In some embodiments, the delimited client cookie list may be stored in any number of data-layers or in various tables comprising settings and configurations for any variable at each step of the method or process.

Cookies may be classified by types or characteristics. Cookie manager 720 may classify or sort cookies by unique identifiers associated with the cookies. A server consumed cookie may be a cookie set by a resource, such as a server 106, issuing a Set-Cookie on the response. The server consumed cookie's values may be checked or may be not checked by any client side code. In certain embodiments, cookie manager 720 may identify or classify a server consumed cookie as a server consumed cookie. In a number of embodiments, cookie manager 720 may remove a server consumed cookie from a downstream transmission of a request or a response and re-inject them into an upstream transmission which is related to the request or the response. In other embodiments, server consumed cookies may be associated with confidential or sensitive data pertaining to sessions. In some embodiments, server consumed cookies may be managed by a cookie manager 720 and may not be sent to a web browser. In certain embodiments, server consumed cookies may be stripped from the message being sent to the web browser and may be stored in the cookie manager 720 or any storage device related to the cookie manager 720.

A client consumed cookie may be a cookie such as a cookie that is set on an upstream transmission by a client 102's web browser via a script such as JavaScript. In some embodiments, a client consumed cookie is a cookie that is set on a downstream transmission from the source, where the source may be a client 102, a server 106 or an appliance 200. In a plurality of embodiments, a client consumed cookie may be checked or modified by the client 102 or the intermediary 200. In some embodiments, client consumed cookies are not checked or modified by the server 106. The server 106 may only accept the requests as they are and may rely on the intermediary 200 to provide the modification to the requests. Similarly, clients 102 may also not modify responses, but may instead rely on the intermediary 200 to modify the responses. In some embodiments, client consumed cookies are checked, edited or modified by the server 106. In further embodiments, a client consumed cookie is not managed by the cookie manager 720, but is instead sent downstream to the web browser of the client 102 instead. Sometimes, client consumed cookies and server consumed cookies may be read, modified and generated by both the client 102 and the server 106. In some embodiments, cookie manager 720 may not manage a client or server consumed cookie, and client or server consumed cookies may be sent downstream toward the web browser of the client 102. In some embodiments, a client 102 may perform the functionality of a server 106, and vice versa. In other embodiments, a client 102 may be used interchangeably instead of a server 106, and a server 106 may be used interchangeably instead of a client 102. In some embodiments, client or server consumed cookies may be used, modified, read, written transmitted to or from any one of the client 102, server 106 or an intermediary 200. In many embodiments, server consumed cookies comprise all functionality of client consumed cookies and may be treated, modified, controlled or otherwise used in the same way and by same components as any client consumed cookies. Sometimes, all cookies may be server consumed cookies. The server consumed cookies may be used, read or edited by the server. In further embodiments, some server consumed cookies are also client consumed cookies. The client consumed cookies may be used, read or edited by the client in addition to being used, read or edited by the server. In some embodiments, the server and client consumed cookies are used, edited, read, written to, or modified by the intermediary 200. Sometimes in some embodiments, some cookies are used by the client and not used by the server.

The upstream or the downstream communication may be used to indicate the direction of the communication. For example, sometimes the upstream request communication or the upstream direction may relate to a communication or transaction from the client 102 toward the server 106. In some embodiments, upstream request communication or the upstream direction may relate to communication or transactions from the server 106 to the client 102. In a number of embodiments, the downstream request communication or the downstream direction may, in some embodiments, relate to communication, transactions or direction from the client 102 toward the server 106. In a plurality of embodiments, downstream request communication or the downstream direction may relate to communication or transactions from the server 106 to the client 102. Sometimes, transactions or communication headed toward the server may be referred to as an upstream transaction or upstream communication and transactions or communication headed toward the client may be referred to as a downstream transaction or downstream communication.

Further referring to FIG. 7A, steps of a method for implementing an embodiment of clientless cookie management is illustrated. At step one, the client 102 sends a request through the intermediary 200 to server 106. The request comprises a URL request, such as a URL provided by the intermediary 200, for example http://abc.com/dir/index.asp. At step two, the intermediary 200 communicates with the cookie manager 720 which checks the incoming request URL against an internal map of cookies available for the domain name and the path provided by the URL. If the cookie manager detects any matches between the incoming request URL and the cookies available in the internal map, an array of name value pairs is returned from the cookie manager to the intermediary. At step three, the intermediary forwards the modified request to the server 106. In some embodiments, the request may also be referred to as HTTP request, and the modified request may be referred to modified HTTP request. The request may be modified to include one or more cookies from the cookie manager 720. Illustrated in FIG. 7A, the message sent in step three comprises a value of 25 assigned to the cookie. At step four, the server responds to the request with a response including a header and body, such as an HTTP header and a content body. The response may include several cookie definitions by Set-Cookie HTTP header. Further to the example, the response from the server comprises Set-Cookie value set to 25. The intermediary may call upon the cookie manager 720 at step five, while passing to the cookie manager the cookie values from the response. The cookie manager 720 checks if the values received are new or updated for the given URL and performs any necessary updates on the incoming map. Cookie manager 720 also checks if client consumed cookies should be returned to intermediary for web browser consumption. At step six, the intermediary sends to the web browser of the client 102 the response from the server with server consumed cookies removed from the header and client consumed cookies added to the header.

In further details, FIG. 7A depicts a client 102 initiating communication with a first request destined for the server 106 by sending the first request to the intermediary 200. Arrow 1 in FIG. 7A signifies the transmission of the first request http://abc.com/dir/index.asp to the intermediary 200. In some embodiments, the first request is transmitted by a server 106, an intermediary 200 or any other device on the network 104. The first request may or may not include a cookie. In some embodiments, the first request includes a URL or an HTTP request. In further embodiments, the first request includes a path to a resource stored on a server 106. In still further embodiments, the first request includes a unique identifier uniquely identifying client 102 out of all devices communicating on the network. In yet further embodiments, the first request includes a unique identifier uniquely identifying a session on the client 102. In still further embodiments, the first request includes a unique identifier uniquely identifying a user on the client 102. In some embodiments, the client 102 transmitting the first request is not cookie configured and does not transmit cookies. In other embodiments, the client transmitting the first request is using a network or a connection which is not secured or not desirable for transmitting sensitive information.

As illustrated by arrow 2 of the FIG. 7A, intermediary 200 receives the first request and forwards it to the cookie manager 720. In some embodiments, intermediary 200 initiates or invokes the cookie manager 720 in response to received first request. In other embodiments, intermediary 200 initiates or invokes the cookie manager in response to the recognition that the client 102 satisfies a set of preconditions for invoking the cookie manager 720. The set of preconditions may include any determination relating the client 102, the session on the client 102 or the user on the client 102. Determinations may be made by the intermediary 200, client 102, server 106 or any other component or device on the network 104. In some embodiments, determinations are made by policy engine 236. In some embodiments, the set of preconditions includes a determination that the request is from the client 102 that does not support cookies. In further embodiments, the set of preconditions includes a determination that the client 102 uses a session or a connection that is not secured. In yet further embodiments, the set of preconditions includes a determination that the client uses a network that is not a secured network. In still further embodiments, the set of preconditions includes a determination that the client 102 may access the requested resource or service on the server 106 requested by the first request.

The intermediary 200 may activate or initiate the cookie manager 720 in order to check or match the received request URL against an internal map of cookies. The internal map of cookies may also be referred to as a map, a list or a semi-colon delimited list of cookies. In some embodiments, a policy of the policy engine 236 matches a portion of the first request against an internal map of cookies. The map may comprise any number of cookies, each of which may be associated, linked or paired up with any number of clients 102, servers 106 or appliances 200. In some embodiments, cookie manager 720 checks or matches the received request URL to a domain or a path of a message stored in the map. In some embodiments, a policy of the policy engine 236 matches an information relating to the client 102 with a domain or a path of the message stored in the map. The domain or the path of the message may match a URL or a portion any portion of the first request with one or more cookies used for the client 102. In some embodiments, cookie manager 720 or a policy detects or determines a match between a portion of the first request and one or more of cookies or a unique identifiers associated with a client 102 or server 106. In some embodiments, cookie manager 720 or a policy of the policy engine 236 detects or determines a match between a portion of the first request and one or more of name value pairs, or value name pairs.

Cookie manager 720 may generate, provide or return one or more name value pairs in response to the match made between a portion of the received request and a cookie or one or more cookies from the internal map of cookies. The match made between a portion of the received request and a cookie or one or more cookies from the internal map of cookies may be made by a policy of the policy engine 236. In some instances, cookie manager 720 returns one or more name value pairs in response to a determination that either a request from a client 102 or a response to the request from the server 106 matches any one of cookies or unique identifiers from the map. In some embodiments, cookie manager 720 may match a portion of a cookie to a portion of a URL from the received request or the response to the received request. Cookie manager 720 may assign the matched cookie to the first request. In some embodiments, cookie manager 720 may modify the first request to include the matched cookie. In some embodiments, cookie manager 720 generates a cookie for the client 102 or the server 106 if a match is not made. In some embodiments, cookie manager generates a cookie for the client 102 of the first request and assigns the cookie to the client 102. The generated cookie may include a value of the cookie. The value of the cookie may be a unique value uniquely associating the cookie with the client 102 in the internal map of cookies. Cookie manager may use the value of the cookie to associate an incoming response to the first request from the server 106 to the client 102. Cookie manager may assign the cookie to the client 102 to be used for the first request and any other future requests of the client 102 to the server 106. Cookie manager 720 or any other portion of the intermediary 200 may rewrite, modify, format, or change the received requests such as the first request to include the matched or generated cookies or satisfy any format or content requirements of the requests received by the server 106.

Still referring to FIG. 7A, arrow 3 represents the step of the appliance 200 transmitting the first request processed by the cookie manager 720 to the server 106. The first request transmitted may be modified. In some embodiments, the request is modified by the cookie manager 720 or the appliance 200. The request transmitted by the intermediary 200 may include one or more cookies from cookie manager 720. In some embodiments, the modified requests include the value of the cookie which cookie manager 720 may use to associate the request to the client 102. The request which has been modified or changed by the appliance 200 or the cookie manager 720 may be referred to as the modified request. The server 106 may receive the modified request in a format which is consistent with the preferences or configurations for the requests to be processed by the server 106. The server 106 may receive the modified request and determine that the received modified request is a valid request.

Arrow 4 illustrates the step of the server 106 transmitting or issuing a response to the modified request. The issued response may include any information, service or resource the client 102 has requested. In some embodiments, the issued response includes a webpage. In other embodiments, the issued response includes a file. In further embodiments, the issued response includes an application or a computer software program. In still further embodiments, the issued response includes an authentication or authorization message or a message for establishing a session with the client 102. The response from the server 106 may include the value of the cookie which may be used to uniquely identify the client 102 for whom the response is destined. The response from the server may comprise a header and content body, either of which may include any of: one or more cookies, one or more cookie definitions, components or parts of one or more cookies, and values or information relating to or associated with the cookies. In some embodiments, the cookie definitions are set by "Set-Cookie" or "Set-Cookie2" HTTP header. "Set-Cookie" or "Set-Cookie2" HTTP header may herein be referred to as Set-Cookie.

Arrow 5 illustrates the step of the intermediary 200 communicating with cookie manager 720 and modifying the response to the first request. In many embodiments, the intermediary 200 transmits to the cookie manager 720 one or more cookie values or unique client identifiers from the response from the server 106. In many embodiments, the intermediary 200 transmits to the cookie manager 720 one or more cookies from the response from the server. The intermediary 200 may activate or initiate the cookie manager 720 in order to check or match the URL from the response against the map or the list of cookies. Intermediary 200 may modify or edit the response of the server to include a cookie that is matched with a portion of the response. In some embodiments the cookie manager 720 may check or match the URL, the header or any other portion of the response to a domain, a path of a message, a cookie or a part of a cookie stored in the map. In such instances, if any cookies or unique identifiers from a portion of the response are matched with a stored information associated with the client 102, intermediary 200 may modify or edit the response to include the into the response the cookie of the client 102 or any other information associated with the client 102, as desired. In cases when the cookie manager 720 detects a match between the URL from the request or the response, one or more of cookies from the internal map or list of cookies, one or more of name value pairs, or value name pairs, may be returned to the intermediary 200. In some embodiments, a policy of the policy engine 236 matches a portion of the response with one or more cookies or unique identifiers. Sometimes, the cookie manager 720 returns an array of name value pairs in response to the match made between a portion of the response and a cookie or a unique identifier. In some embodiments, the cookie manager 720 may match a portion of a cookie to a portion of a URL from the received request. In a number of embodiments, the cookie manager 720 matches a portion of a cookie to any portion of the received request, such as a URL, a body, or a header of the request. In some embodiments, if the cookie manager 720 does not match a portion of the received response to the request to any cookie, or any unique identifier, the cookie manager 720 generates a new cookie or a new unique identifier or both and assigns it/them to a client 102 or a server 106. The cookie manager 720 may modify the response of the server 106 to the first request using the new generated cookie. Such new cookies and unique identifiers for clients or servers may be used for any future requests or responses of the same clients or servers 106. In some embodiments, cookie manager 720 determines that there are new or updated cookie values for the requests of the client 102 or responses of the server 106 and further updates the map or database accordingly. In addition, cookie manager 720 may also determine if the cookies consumed by the client 102 should be returned to the intermediary 200 for web browser consumption.

Still referring to FIG. 7A, arrow 6 illustrates a step of the intermediary 200 sending or forwarding the modified response to the client 102 via a downstream response. In some instances, the downstream response may be referred to as the transmission from the server 106, via the intermediary 200, towards the client 102. Similarly, the upstream communication may be any communication from the client 102, via the intermediary 200, and towards the server 106. In some embodiments, the modified response does not include any cookies. In further embodiments, the modified response includes the unique client identifier which is used by the cookie manager 720 to associate one or more client 102 associated cookies to the client 102. In still further embodiments, the modified response includes any format desired or accepted by the client 102. The modified response from the intermediary 200 to the client 102 may comprise server consumed cookies removed from response. In some embodiments, the modified response forwarded may comprise client consumed cookies re-added to the header or any other part of the response. In many embodiments, the modified response from the intermediary 200 to the client 102 includes the response from the server 106 modified to exclude the cookie associated with the client 102 in the cookie manager 720.

Cookie management, such as the cookie management by cookie manager 720 may cause or provide services, resources or applications used by the client 102 and provided by the server 106 to run or be provided within the same cookie domain namespace. The intermediary 200 may provide client side cookie management or server side cookie management to increase the security of the cookies transmitted between the client 102 and the server 106. Cookie management, such as client side cookie management, may eliminate the restrictions of the HTTP protocol limitations such as the maximum amount of cookies allowed from a single source per a single client. For example, in a system which may only allow 20 cookies per session with a client, cookie management by the cookie manager 720 of the intermediary 200 may enable the client to eliminate such limitation by reusing the cookies associated with the client and stored in the cookie manager 720. Using client side cookie management, in such examples, may enable the client 102 to continue communicating with the server 106 even in situations when the 20 cookies per session limitation would affect the service provided to the client. In this case, the intermediary 200 intercepting and forwarding the communication between the client and the server may manage, modify, rewrite or edit portions of the requests or responses and use the cookies associated with the client or the server, thus enabling the communication even after more than 20 cookies are transmitted.

Clientless cookie management performed by the cookie manager 720 or the intermediary 200 may involve rewriting cookie paths on the downstream cookie headers which are headed toward the client 102 or to the server 106. In some embodiments, the cookie manager 720 or the intermediary 200 forwards the responses or the requests from the client 102 or the server 106 to the intended destinations without changing or modifying them. In other embodiments, clientless cookie management performed by the cookie manager 720 may involve state management by the intermediary 200. The cookie manager 720 may be invoked by the intermediary for checking upstream requests for server cookies that should be injected into the stream or communication directed to the server 106. The responses from the downstream communication that are intended to be modified such that they are stripped of the cookies may persist in the cookie manager.

Referring now to FIG. 7B, a sequence diagram of an embodiment of steps of a method for clientless cookie management is depicted. In brief overview, FIG. 7B illustrates a browser of the client 102 communicating with a web application of the server 106 via an appliance 200 and cookie manager 720. Client 102 sends an HTTP request to the appliance 200, which herein may also be referred to as an intermediary 200. Intermediary 200 processes the request and uses cookie manager 720 to check for cookies. Cookie manager 720 returns the cookies associated with the request to the intermediary 200. The intermediary 200 modifies the header of the HTTP request to include the cookies and transmits the modified HTTP request to the server 106. The server 106 returns the HTTP response to the HTTP request. Intermediary 200 sends any cookies from the HTTP response to the cookie manager 720 to be added to the map used to associate all the cookies of the client 102 with the client 102. The intermediary 200 modifies the response to remove the cookies from the HTTP response and uses cookie manager 720 to further add any client 102 related cookies to the HTTP response. The intermediary 200 transmits the modified HTTP response to the client 102.

In further overview, FIG. 7B illustrates client 102 sending a request to the intermediary 200, herein also referred to as the proxy. The request may be any request to access any resource or any service provided by the server 106. In some embodiments, the request is a HTTP request to access a webpage or a website related service. In other embodiments, the request is a request to establish a connection with the server 106. In further embodiments, the request is a request to establish a session with the server 106. In still further embodiments, the request is a request use an application provided by the server 106. In yet further embodiments, the request is a request to access a streaming file, such as an audio or a video file. In yet further embodiments, the access is an access to a secure documentation. The request may include multiple requests.

Intermediary 200 may process the received request and use cookie manager 720 to check for cookies. The intermediary may process the request and establishing which, if any, cookies client 102 includes. Processing of the request may further include establishing a unique client identifier to identify any further communication with the client 102. The intermediary 200 may processes the request and forward it to the cookie manager 720. In some embodiments, the intermediary 200 forwards a portion of the request to the cookie manager 720. In some embodiments, cookie manager 720 uses one or more maps to relate or associate client 102 related information such as the unique identifiers of the client with cookies used for communication by the clients 102 to the server 106. Similarly, the maps of the cookie manager 720 may be used to associate any client 102 side cookies with the server 106 side cookies that the client 102 uses for the communication with the server 106. In some embodiments, a unique identifier from a request is matched to a name value pair or a cookie in the map. The cookies may be associated with the client 102 via the map of the cookie manager 720. Cookie manager 720 may create new cookies for the client 102 if such cookies already do not exist in the map of the cookie manager 720.

In some embodiments, as each request or a response is processed by the intermediary 200, the intermediary 200 checks if the URL of the transmission being processed is server side cookie management enabled. Intermediary 200 may call the cookie manager related function such as ProcessRequest( ) to do request processing. Cookie manager 720 may further check an internal map, which may be a cookie manager map or a cookie manager list, used to help determine if there are any incoming cookies that need to be added to the upstream request. Cookie manager 720 may also record all cookies encountered for the first time in the session inside the map for future requests. Cookie manager may also ensure that the system is not sending certain cookies, such as appliance 200 related cookies for example, to hosted web applications, such as for example, the NSC_AAAC. In some embodiments, a function, such as ProcessRequest( ) function for example, may call another function, such as FilterCookies( ) for example, internally. In some embodiments, FilterCookies( ) may call ProcessRequest( ). In some embodiments, the two sets of values may be referred to as a Citrix.Fei.ClientCookies and a Citrix.Fei.ServerCookies. Cookie manager 720 may use Citrix.Fei.ClientCookies and a Citrix.Fei.ServerCookies to create a semi-colon delimited list or an internal cookie manager map, herein also referred to as a cookie manager list or the map. The map may be used during decision making process of cookie management. The cookie manager 720 may serialize the cookie manager map entries in the cookie manager 720 into the two session values, Citrix.Fei.ClientCookies and Citrix.Fei.ServerCookies. The cookie manager 720 may also use these two values to persist to the session or associate to the session the client 102 or the server 106 for any future transmissions. If the cookie manager 720 matches the request of the client 102 to a cookie or a plurality of cookies in the map, the cookie manager 720 may transmit the cookie or the plurality of cookies to the appliance 200.

The intermediary 200 may modify the header of the HTTP request and transmit the modified HTTP request to the server 106. In some embodiments, the cookie manager 720 modifies the request to include the cookie or the plurality of cookies that are associated with the client 102. In some embodiments, the cookie manager 720 modifies a portion of the request, such as a URL or a heading to include a value or a set of values or characters identifying a cookie. In some embodiments, cookie manager 720 modifies the request to include or add a portion of a cookie which is associated with the client 102. In other embodiments, cookie manager 720 modifies the request to include or add an unique identifier associated with the client 102. In further embodiments, cookie manager 720 modifies the request to exclude or remove a cookie or a unique identifier from the request of the client. In some embodiments, any component of the intermediary 200 modifies the request to include the cookie or the cookies provided by the cookie manager 720.

The intermediary 200 may perform any number of modifications to the request. In some embodiments, intermediary 200 overwrites a portion of the request with one or more portions of one or more cookies. In other embodiments, intermediary 200 adds a portion of one or more cookies, or a plurality of portions of one or more cookies to the request. In still further embodiments, intermediary 200 modifies the cookie within the request. The intermediary 200 may change one or more values or characters within the cookie or otherwise modify the cookie to be acceptable by the server 106. In yet further embodiments, intermediary 200 encrypts a portion of the request. In still further embodiments, intermediary 200 modifies the request to accommodate any configuration related preferences or requirements of the server 106. The modified request may be changed such that it can be processed by the server 106. The intermediary 200 may transmit the modified request to the server 106.

The server 106 may process the modified request and in response transmits to the intermediary 200 a response to the request. In some embodiments, the response to the request includes an HTTP transmission. In further embodiments, the response includes a webpage. In yet further embodiments, the response includes a file the client 102 requested. In still further embodiments, the response includes an authentication message to authenticate the client 102 on the server 106. In yet further embodiments, the response includes a transmission for starting or opening a session or a connection between the client 102 and server 106. In still further embodiments, the response includes an executable file, a program, a function, data, a streaming file or any other resource or service provided by the server 106. In some embodiments, the server 106 transmits to the intermediary 200 a plurality of responses to the request.

Intermediary 200 may send any cookies from the HTTP response to the cookie manager 720 to be added to the map of the cookie manager 720. Any new cookies added to the map of the cookie manager may be used for future transmissions between the client 102 and server 106. In some embodiments, the intermediary modifies the reply to exclude cookies from the reply. In other embodiments, the intermediary takes out the cookies from the reply and transmits the cookies to the cookie manager 720. The cookie manager 720 may compare the received cookies to the cookies already stored in the map. In some embodiments, cookie manager 720 stores the received cookies in response to the determination that the received cookies were not previously stored in the map in relation to the client 102 or the server 106. The cookies stored may be utilized later for the communication for the same client 102. In some embodiments, the transmission to the cookie manager 720 comprises any number of cookies or a portion, a cookie or a unique client identifier relating the client 102, the server 106 or both the client 102 and the server 106.

The intermediary 200 modifies the response to remove the cookies from the HTTP response. The intermediary may further use the cookie manager 720 to add any client 102 related cookies to the HTTP response, if such cookies exist or are necessary. In some embodiments, the intermediary modifies, edits or changes the response to exclude any server 106 cookies. In further embodiments, the intermediary 200 modifies the response to replace the server 106 cookies with client 102 cookies. In yet further embodiments, the intermediary 200 modifies the response to satisfy the format, configurations or preferences of the client 102, so that the modified response may be acceptable or usable to the client 102. As each response or request is processed, the intermediary 200 may determine if a server side cookie management or a client side cookie management is enabled. In some embodiments, as server side cookie management is enabled the intermediary 200 may call upon a function, such as a cookie manager 720 function ProcessResponse( ). In a number of embodiments, as client side cookie management is enabled the intermediary 200 may call upon cookie manager 720 function ProcessResponse( ) or another function which performs cookie or unique identifier management or internal cookie map management. The cookie manager 720 may check the cookies from a received response or request for the server or client consumed cookies. In some embodiments, the cookie manager matches the cookies received from the request or the response to cookies stored or listed in the map. The cookie manager 720 may also add a name value pair, registering or assigning a new cookie or a new client identifier in the map if such cookie or client identifier was not registered, listed or assigned in the map earlier. Cookie manager 720 may thus populate the map with new client identifier or new cookies which may be used in the future communication with the clients and servers associated with such cookies or unique identifiers. In a number of embodiments, cookies or Set-Cookie header may be removed from the response when handed back to the intermediary 200. By preventing the server consumed cookies from being sent to the client, the system may extend a number of cookies for a given domain to a number beyond a predetermined limit. In systems which limit the number of cookies to a maximum of 20, this feature may be useful to enable the client 102 to keep using the service on the server 106 without reaching the limitation of 20 cookies maximum. Such practice may also prevent important cookie data from being accessed or read in the network space beyond a firewall of the company sending out the sensitive information.

The intermediary 200 transmits the modified HTTP response to the client 102. In some embodiments, the modified response includes a client 102 cookie. In other embodiments, the modified response includes the original request as sent by the server 106 to the intermediary 200. In still further embodiments, the modified response includes a portion of the response that is reformatted to be in accordance with configuration or standards of the client 102 or the client 102 application or function used for processing of the modified response. The intermediary 200 may in response to the received modified response transmit to the intermediary 200 another request destined for the server 106.

The intermediary 200 may apply any of the access profiles, policies, rules and actions to any level of granularity of portions or subsets of network traffic traversing the intermediary 200. The level of granularity may range from fine to coarse based on the configuration. The logic, criteria or conditions of rules of access profiles, rules and policies described herein may be defined or specified to apply to any desired subset or portion of network traffic or transmissions transmitted via the appliance 200. In one aspect, the level of granularity refers to a degree, measurement, fineness or coarseness of portions of network traffic to which the configuration may apply. In very broad or coarse granularity of configuration, an access profile, rule or a policy may apply to all network traffic. In a very fine granularity configuration, an access profile or policy may apply to a specific subset of network traffic of a particular user, such a traffic or portions of traffic of a particular application of a particular user.

In some granularity configurations, an access profile, policy or a rule applies to any client 102 sending a request to a server. The policy, rule or access profile may be defined to address, or apply to any client 102, and may be based on any configuration of the client 102 or information relating the client 102, such as for example a portion the client 102 request. Similarly, the policy, rule or access profile may be defined to address, or apply to any server 106, and may be based on any configuration of the client 106 or information relating the server 106, such as for example a portion the server 106 response. In some granularity configurations, an access profile, policy or a rule is defined to apply to a specific session or connection the client 102 is using to connect to the server 106, via the appliance 200. In further embodiments, an access profile, policy or a rule is defined to apply to any client 102 the is connected via SSL VPN session or connection.

In further embodiments, an access profile, policy or a rule is defined to apply to any client 102 that is connected via clientless SSL VPN session or connection. In still further embodiments, an access profile, policy or a rule is defined to apply to any client 102 that is connected to via client based SSL VPN session or connection. In still further embodiments, an access profile, policy or a rule is defined to apply to any client 102 or client session that sends a request to a particular server 106. In yet further embodiments, an access profile, policy or a rule is defined to apply to any client 102 or client session that requests a particular application or a resource on the server. In further embodiments, an access profile, policy or a rule is defined to apply to any client 102 or client session based on the cookie configuration, for example if the cookies are enabled or disabled. In still further embodiments, an access profile, policy or a rule is defined to apply to any client 102 or client session that sends a request that includes a particular URL, or a portion of a particular URL. In yet further embodiments, an access profile, policy or a rule is defined to apply to any client 102 or client session based on a match between a portion of the request sent by the client 102 and a phrase or a key of the access profile, policy or the rule. In some embodiments, an access profile, policy or a rule is defined to apply to any server 106 or a server session based on an information relating a client 102 accessing the server 106. Such information may include a portion or feature of the request of the client 102, a setting or configuration of the client 102, or any other client 102 related information. In some embodiments, an access profile, policy or a rule is defined to apply to any server 106 or server session based on the configuration of the server 106 or the features of the content that the server 106 is transmitting to the client 102.

Referring now to FIG. 7C, an embodiment of a cookie proxy data flow control is illustrated. In brief overview, FIG. 7C depicts a client 102 communicating with a server 106 via an intermediary 200 that manages the flow of the cookies between the client 102 and a server 106. Client 102 sends a request to a server 106 via an appliance, also referred to as an intermediary 200. The request comprises a URL such as "GET/index.html HTTP/1.1". Intermediary 200 intercepts the request sent by the client 102 and forwards the request to the server 106. The server 106 in response to the request, issues a response that comprises a cookie, such as for example, "HTTP/1.1 200 OK\nSet-Cookie: name=value". Intermediary 200 strips and stores the cookie and replaces the cookie with a client ID that uniquely identifies the client 102. The unique client ID may be a consolidated cookie and may be associated with the cookie in the intermediary 200 for future transmissions. Intermediary 200 forwards the modified response that includes the unique client ID to the client 102. The modified server's response may comprise information such as for example, "HTTP/1.1 200 OK\nSet-cookie: NSC_AAAC=Unique client ID". The client 102 transmits a second request using the unique client ID, such as "GET/foo.html HTTP/1.1\nCookie:NSC_AAAC=Unique client ID". Intermediary 200 receives the second request and using the unique client ID retrieves the cookie that was stored based on the unique client ID. Intermediary 200 modifies the request and inserts the previously stored cookie into the request. The modified second request may be formatted to include the same or a similar cookie that was used in the prior transmission, such as for example, "GET/foo.html HTTP/1.1\nSet-Cookie: name=value". Intermediary 200 transmits the modified second request to the server 106.

Further referring to FIG. 7C, the client 102 may initiate the communication with the server 106 by sending a request to the intermediary 200. In some embodiments, the request may be an HTTP request, such as for example, "GET/index.html HTTP/1.1". In some embodiments, client 102 attempts to communicate with the server 106 for the first time. In further embodiments, the client 102 transmits any HTTP request destined for the server 106 to the intermediary 200. The client 102 may transmit any request to the intermediary 200 to access a resource or a service on the server 106.

The intermediary 200 may forward the request to the server 106. In some embodiments, intermediary 200 modifies the request and forwards the modified request to the server 106. In other embodiments, the intermediary 200 does not modify the request. In further embodiments, intermediary 200 forwards the request to the server 106 without modifying any portion of the request. In some embodiments, intermediary forwards the HTTP request, such as for example, "GET/index.html HTTP/1.1", to the intermediary 200.

The server 106 may issue a response to the request that may include a cookie. In some embodiments, the response may be, for example, "HTTP/1.1 200 OK\nSet-Cookie: name=value". The cookie may be in a header of a response or within any other portion of the response. In some embodiments, the cookie may be included in the URL of the response. The cookie may be any type and form of cookie and may be included anywhere within the response.

Intermediary 200 may strip and store the cookie from the response and replaces the cookie with a client ID that uniquely identifies the client 102. Once the response of the server 106 is received by the intermediary 200, the intermediary may create a cookie-jar for the given domain for the client. The cookie jar may include or store any collection of cookies for a given domain and client, such as client 102. In some embodiments, the cookie jar may be a file, a list, a database, an array, a data structure or a folder comprising any number of cookies or any number of information comprised by the cookies. In some embodiments, the intermediary 200 may strip "Set-Cookie" header from the response header issued by the server 106 and it may store the Set-Cookie header into the cookie-jar. The intermediary 200 may also generate a unique cookie-proxy session cookie. The cookie proxy session cookie may comprise any relevant information the client 102 may receive from the cookie sent by the server 106 without actually receiving the cookie. The cookie proxy session cookie may thus convey all the relevant information from the cookie sent by the server 106 to the client 102 in a manner acceptable by the client 102 or by the client 102's web browser. The intermediary 200 may insert a cookie-proxy session cookie into the cookie-jar or relate a cookie proxy session cookie with the related and corresponding cookie sent by the server 106. In a number of embodiments, the intermediary 200 may insert the cookie proxy response cookie into a response header of the message to be sent from the intermediary 200 to the client 102. In some embodiments, the intermediary 200 may leave the domain and path unchanged, while in other embodiments, the intermediary may change either the domain or the path, or both the domain and the path. In some embodiments, the intermediary 200 inserts a unique client ID into any part of the communication sent from the intermediary to the client 102.

Intermediary 200 may forward the modified response to the client 102. The modified response may include a unique client identifier, such as a unique client ID. In some embodiments, the modified response includes a client 102 cookie. In further embodiments, the modified response is modified to be in accordance with the configuration of the client 102. In some embodiments, the modified response includes the original response of the server 106 without any modifications. The modified server's response may comprise information in any HTTP form, such as for example, "HTTP/1.1 200 OK\nSet-Cookie:NSC_AAAC=Unique client ID".

The client 102 transmits a second request using the unique client ID. The second request may be same, similar or substantially similar to the first request. In some embodiments, the second request includes the same form as the first request. In further embodiments, the second request is by the same application used for transmitting the first request. In some embodiments, the second request is an HTTP request, such as "GET /foo.html HTTP/1.1\nCookie:NSC_AAAC=Unique client ID". The second request may include the unique client ID or a portion of the unique client ID issued by the intermediary 200.

Intermediary 200 may modify the second request to include the cookie associated with the server 106. Intermediary 200 may retrieve the server 106 cookie using the unique client ID that was stored in association with the cookie of the server 106. Intermediary 200 may modify second request and inserts the previously stored cookie into the second request. Intermediary 200 may modify the request and insert the previously stored cookie into the request. In some embodiments, intermediary 200 modifies the request to include the previously stored cookie into the second request. The intermediary 200 may check if the cookie proxy session cookie is present. In case that the cookie proxy session cookie is present, the intermediary 200 searches the cookie jar based on the cookie proxy session cookie. Intermediary 200 may use the cookie which is retrieved using the cookie proxy session cookie to find the intended domain and path. Intermediary 200 may also insert cookie or cookies in the request code path and/or strip the cookie-proxy-session-cookie.

In some embodiments, the proxy 200 may keep a reference pointer from server-side PCB to the cookie jar in order to mark the response path. In further embodiments, the proxy 200 keeps a reference pointer from session information in the cookie in order to mark the response path. In some embodiments, if the cookie jar has already been created for a specific session involving a specific client 102 and a server 106, the intermediary 200 may not create a cookie jar during the second set of communications within the same session. Instead, the intermediary 200 may use the same cookie jar as used previously for the same session. In some embodiments, the intermediary 200 may already have a reference to a cookie jar created for a client 102 and a server 106. In a number of embodiments, the reference to a cookie jar may be implemented through a protocol control block or PCB, a controller, as well as any piece of software, a database, an array or a structure comprising any set of values. In certain embodiments, if the client disables cookies, then no subsequent requests from the client may comprise any cookie proxy session cookie. In some embodiments, if the client disables cookies, subsequent requests from the client may comprise a cookie proxy session cookie. In some embodiments, subsequent responses from a server 106 to a client 102 may create a cookie jar with no further reference to the client 102 or the server 106 the cookie jar is used for. In further embodiments, subsequent response from a server 106 to a client 102 may create a cookie jar with reference to the client 102 or the server 106 the cookie jar is used for.

In a number of embodiments wherein a client 102 is communicating with a server 106 for more than one time in a given session, the intermediary 200 may not send the cookie-proxy session cookie again after the first communication. The intermediary may use a unique client identification method to uniquely identify a client 102 or a server 106. In some embodiments, a unique client identification method, also referred to as unique client ID, may be used to uniquely identify a client 102 communicating to a server 106 or a server 106 communicating to a client 102. In a number of embodiments, a unique client ID may be used to uniquely identify a client 102 communicating or sending a message or a request to a server 106 via an intermediary 200. In a plurality of embodiments, a unique client ID may be used to uniquely identify a server 106 communicating or sending a message or a request to a server 106 via an intermediary 200. In some embodiments, the intermediary 200 uses the unique client ID to detect and determine whether to proxy a communication sent by a client 102.

In a number of embodiments, an intermediary 200 may perform cleaning up of cookies, determining unnecessary cookies or terminating unnecessary cookies. In a number of embodiments, an intermediary 200 may use a reference pointer from a client 102's PCB to a cookie jar created for the client 102. The modified second request may be formatted to include the same or a similar cookie that was used in the prior transmission. In some embodiments, the modified second request is an HTTP request, such as a modified second HTTP request such as for example, "GET/foo.html HTTP/1.1\nSet-Cookie: name=value".

Intermediary 200 may transmit the modified second request to the server 106. In some embodiments, intermediary 200 transmits any number of modified requests to the server 106. The modified requests may be of any type, form and format. Intermediary 200 may thus utilize the cookie jar to transmit back and forth any number of requests from the client 102 and responses from the server 106.

Cookie Proxy may be any module controlling, managing or reforming cookies or transmission of cookies utilizing configuration settings. In some embodiments, cookie proxy may be cookie manager 720. In a number of embodiments, cookie proxy may be a part or a subcomponent of cookie manager 720. In a plurality of embodiments, cookie proxy may comprise a cookie manager 720. In certain embodiments, cookie proxy may be used interchangeably with cookie manager 720 and may comprise any and all functionality and means of performance of a cookie manager 720. In some embodiments, cookie manager 720 may be referred to as cookie proxy. In a number of embodiments, cookie proxy may be independent of intermediary 200 or a cookie manager 720. In certain embodiments, cookie proxy may be a software program or an application capable of working independently from the intermediary 200 or cookie manager 720 or working together with the intermediary 200 or cookie manager 720.

Cookie proxy may comprise configuration settings based on a policy or action of a policy. In a number of embodiments, a user or an administrator may configure the cookie proxy to determine what cookies to store into the cookie jar, and what cookies not store into cookie jar. In a plurality of embodiments, a user or an administrator may decide for any specific domain, such as for example "www.foo.com", if the intermediary 200 should proxy cookie1 and allow cookie2, cookie3 to flow through, as any of the cookie1, cookie2 and cookie3 may or may not be client consumed cookies.

In some embodiments, cookie proxy configuration may utilize a command line interface (CLI) syntax such as for example:

```
add/delete/set/unset/show cookieproxy action <action-name>
<ALL [ -EXCEPT <cookie-name>,[<cookie-name>,...]] |
<cookie-name>,[<cookie-name>,...]>
```

In addition the cookie proxy configuration may also comprise other syntax such as:

```
add/delete/set/unset/show cookieproxy policy <name> <rule> <jar name>
[-CookieProxyAction <action-name>] [<undefAction>]
```

In a number of embodiments, if no action is specified by the user or the administrator, the default behavior by the cookie proxy may be to proxy all the cookies, or proxy none of the cookies, or proxy a fraction of cookies as determined by a set of policies relating the cookie proxy.

A bind operation may bind, group, tie together or associate a configuration, such as a policy, with an entity, such as a user or resource. The act of binding may place the configuration into an active state to be applied to the assigned entity. In some embodiments, a bind operation may associate one entity with another entity or apply the functionality of a module to an entity. A bind operation may be an operation performed by the cookie proxy, or by policy of the cookie proxy. In some embodiments, through configuration commands the cookie proxy may be bound to a virtual server 275. In a number of embodiments, the cookie proxy policy may be bound to a load balancing server, a GSLB server or a VPN server. The policy rule utilized by the cookie proxy or by intermediary 200 may be any policy infrastructure rule language (PIRL) based. In some embodiments, the policies utilized by the cookie proxy or intermediary 200 may be evaluated during the response time, or the time the intermediary or the cookie proxy to respond to a request or both. In a number of embodiments, the policies utilized by the cookie proxy or intermediary 200 may be evaluated or implemented during the response time.

In some embodiments, the cookie proxying method may use the unique client IDs assigned to each client. The unique client-id may be used by the intermediary 200 to map a cookie-jar associated with a specific client 102 to the client 102. In a number of embodiments, a client, also referred to as client 102, may not send any unique client ID along with a transaction, also referred to as communication or a request. In a number of embodiments, a cookie proxy session cookie may be used as a default client-identification mechanism or a unique client ID. In some embodiments, client identification may be based on a client's internet protocol address, fragments of request or HTTP communication, a unique components of a communication sent by the client 102 or the server 106, a unique feature relating a session, an SSL VPN session cookie or an SSL VPN session body. In a number of embodiments, client identification may be configurable. In a plurality of embodiments, client identification may be implemented utilizing client 102's internet protocol address, also referred to as IP address.

Cookie jar cleanup, or cookie jar elimination may be completed pending a determination of a variety of parameters such as the size of a cookie jar or timing relating a cookie jar, such as idle timing of the cookie jar for example. In some embodiments, cookie jar clean up method may utilize a time-out of idle time or a memory-threshold. In a number of embodiments, the cookie jar clean up may be implemented based on configuration associated with a cookie itself or a session timeout which may result in all the cookies belonging to the session being cleaned up following a time-out. In some embodiments, cookie jar clean up method may determine which cookies to clean up based on the amount of time which has passed since a particular cookie or a cookie jar was last used or accessed.

In some embodiments, CLI syntax may be used for jar and client identification, such as for example:

```
add/delete/set/unset/show cookieproxy jar <jar-name>
  -clientidentification <default | request based PIXL expression>
  -maxMem <Memory limit>
```

In a number of embodiments, default may be to use a session cookie inserted by cookie proxying module into a header or in the URL if cookies are not supported. In a plurality of embodiments, a rule of policy may be used to find any unique header field, e.g. cookie for SSL VPN or a session cookie for LB load balancing.

In a number of embodiments, when a maximum memory limit is reached for any cookie jar, a session which is inactive for the longest duration of time may need to be timed-out and the cookies belonging to that session may need to be cleaned up. In a plurality of embodiments, a timestamp may be associated with each client 102, server 106, a client/domain combination, or each client-server session, or any session in order to achieve a URL based cleanup.

Runtime aggregation of different policies or actions may be utilized by the cookie proxy or the intermediary 200. In a number of embodiments, runtime aggregation of policies or actions may be used by the intermediary 200 or the cookie proxy in order to decrease the configuration overhead or simplify the configuration modification. In a plurality of embodiments, the intermediary 200 or the cookie proxy may be configured to stop at first matched policy. In some embodiments, the administrator or the user has to do the aggregation during configuration time and create appropriate policy and action. In certain embodiments, the runtime behavior of cookie proxy action is ruled in part by searching for a match in the policy or the list of polices and stopping at the policy once the match is encountered. In some embodiments the cookie proxy may stop at a first policy defining or comprising a set of cookies to be proxied or an information relating a set of cookies to be proxied, which may reduce the run-time aggregation.

Cookie jar infrastructure may be used for cookie repository, however in some instances, additional API may used for retrieving cookies based on domain or path. In some embodiments, a hash based search mechanism may be used to retrieve cookie proxy sessions. This method may be similar to an SSL VPN session hashing mechanism utilized in other Intermediary 200 related applications. In a number of embodiments, a key for the hash function may depend on client identification mechanism or client identification protocol. In a plurality of embodiments, a different hash function for a different client identification mechanism may be utilized.

Cookie repository management may depend on performance or resources. In some embodiments, cookie repository is managed by associating a cookie jar per client per domain. In a plurality of embodiments, the set of cookie names comprises cookie names repeatedly stored in every cookie jar. In a number of embodiments, the set of cookie names used is different from a cookie jar to a cookie jar, while in other embodiments the set of cookie names used between a plurality of cookie jars comprises some of the same or similar names. In some embodiments, cookie jars are organized such that a cookie jar may be associated with a specific client and with a specific virtual server handling the transmission. In a number of embodiments, cookie jars are organized such that a cookie jar is associated with a client, a virtual server and a domain.

In some embodiments, a cookie jar may store no cookies which are named same as another cookie within the jar. In certain embodiments, a cookie jar may comprise cookie names having values associated with cookie names in a method similar to the method utilized in headers, such as HTTP headers for example.

Cookie proxy may comprise a number of functionalities. In some embodiments, a cookie proxy may utilize cookie proxying or any number of embodiments discussed herein to determine if a browser may handle or accept cookies or not. In a plurality of embodiments, a cookie proxy may determine if the request sent by a client 102 or a server 106 matches certain criteria in order to determine if a browser from the client or the server accepts or handles cookies. In some embodiments, if the request sent by the client 102 or the server 106 matches the criteria for being able to accept or handle cookies the intermediary 200 may send a redirect message to the client, such as:

--- http://incoming_host/incoming_url?new_param_added=secure_client_id along with a secure_client_id set-cookie.

---

In some embodiments, if the client comes back with the request URL such as for example "http://incoming_host/incoming_url?new_param_added=secure_client_id", the intermediary may verify if the unique client ID is associated with the cookie value. If the intermediary detects a match, the intermediary may strip off the parameter it had added and may process the original request. In addition, the intermediary may also mark the cookie-proxy session to use "cookie-proxy session cookie". In case where the unique client ID is not matched with the cookie value, the intermediary may utilize a different method such as body-rewriting for session tracking. In such a method the response body may be rewritten to include the session info into each HTTP link.

In some embodiments, the cookie proxy or the intermediary 200 may also comprise cookie proxy cookie jars, also referred to as cookie proxy session cookie jars. Cookie proxy cookie jars may comprise any number of cookie proxy cookies, also referred to as cookie proxy session cookies. In a number of embodiments, cookie proxy cookie jar may be organized or implemented in a similar manner to the cookie jar, and may comprise all functionality of a cookie jar.

In certain embodiments, cookie-proxy cookie jars may be capable of working together with highly available applications and technologies, also referred to as HA technologies. In some embodiments, an intermediary comprising a set of cookies and unique client IDs may communicate the cookies and client IDs to other appliances on the network. In a plurality of embodiments, a first intermediary 200 comprising a cookie and a unique client ID associated with a client 102 or a server 106 may share the information relating the cookie or the unique client ID with a second intermediary 200 or a plurality of appliances 200. In cases where the first intermediary shares the information relating a cookie or a unique client ID with the second appliance, the second intermediary may also be able to implement communication between the client and the server using the cookie and the unique client ID.

Cookie proxy, cookie manager 720 or the intermediary 200 may comprise any number of software applications or functions implemented in script or software in order to establish and manage cookies. In some embodiments the cookie proxy, cookie manager 720 or the intermediary 200 may comprise a software code for managing a cookie jar such as for example:

---

```
/* AppSecure Cookie-jar API. */
/* Create an empty cookie jar */
as_cookie_jar_t *as_cookie_jar_create(as_allocator_t *allocator);
/* Get value of a cookie, given name */
as_cookie_t *as_cookie_jar_get(as_cookie_jar_t *cookie_jar, astr_t *name);
/* Add a cookie to the jar. If nodup is set, and a previous cookie exists with the same
name,path,domain, then delete it before adding the new one */
ns_status_t as_cookie_jar_add(as_cookie_jar_t *cookie_jar, as_cookie_t *cookie, int
nodup);
/* Delete cookies with same name, value, path and domain as cookie */
ns_status_t as_cookie_jar_delete(as_cookie_jar_t *cookie_jar, as_cookie_t *cookie);
/* Delete all name-value pairs given name */
ns_status_t as_cookie_jar_delete_by_name(as_cookie_jar_t *cookie_jar, astr_t *name);
/* Destroy cookie-jar */
void as_cookie_jar_destroy(as_cookie_jar_t *cookie_jar);
/* Parse an http Cookie header cookie string into multiple cookies and add
 * them to the cookie jar */
ns_status_t as_cookie_jar_parse_cookie(as_cookie_jar_t *cookie_jar, const astr_t
*cookie_string);
/* Parse an http Set-Cookie header string into multiple cookies and add them to the
cookie jar */
ns_status_t as_cookie_jar_parse_set_cookie(as_cookie_jar_t *cookie_jar, const astr_t
*cookie_string);
/* Stringify cookie jar to use as cookie value in an http request */
astr_t *as_cookie_jar_to_cookie_string(as_allocator_t *allocator, as_component_t
owner, as_cookie_jar_t *cookie_jar);
/* Stringify cookie jar to use as the set-cookie value in the http response */
astr_t *as_cookie_jar_to_set_cookie_string(as_allocator_t *allocator, as_component_t
owner, as_cookie_jar_t *cookie_jar);
/* Create an iterator */
as_cookie_jar_iterator_t * as_cookie_jar_iterator_create(as_allocator_t *allocator
as_component_t owner_id, as_cookie_jar_t *cookie_jar);
int as_cookie_jar_iterator_init(as_allocator_t *allocator, as_component_t owner_id,
as_cookie_jar_t *cookie_jar, as_cookie_jar_iterator_t *iter); int
as_cookie_jar_iterate(as_cookie_jar_iterator_t *iter, as_cookie_t **cookie);
void as_cookie_jar_iterator_destroy(as_allocator_t *allocator, as_cookie_jar_iterator_t
*iter);
int as_cookie_jar_size(as_cookie_jar_t* cookie_jar);
as_cookie_jar_iterator_create(as_allocator_t *allocator, as_component_t owner_id,
as_cookie_jar_t *cookie_jar);.
```

---

The cookie manager or proxy may determine when, how and what cookies to manager and/or store to cookie jars, and any of the operations described above, responsive to one or more policies of the policy engine, include any rules, conditions or actions of such policies. Any of the policies and the corresponding cookie operations may be based on a session. In a number of embodiments, policy engine 236 provides policies or rules through which an action regarding the cookie management is determined. In some embodiments, policy engine 236 may comprise a list of policies or rules providing a means for the intermediary 200 or the cookie manager 720 to determine an action concerning a cookie or a unique client ID to be implemented. As such, through configuration and policy, the intermediary may provide fine granular control for cookie management, including for clientless SSL VPN access.

In one example, a server may be providing access to a number of clients accessing different applications via the appliance 200. Two of such applications may be application1 and application2. Both applications may use ASP.NETSESSIONID which may be a server consumed cookie that is not used and not written to on the client side. In addition to ASP.NETSESSIONID, application1 may further use a cookie AppClientInfo which may be read and written to by a first client accessing or using the application 1, but not by a second client accessing the same application.

In such embodiment, the configuration of the appliance 200 to handle such, or a similar situation, may be:

```
add patclass app1_clientconsumed_cookies
bind patclass app1_clientconsumed_cookies AppClientInfo
set vpn clientlessAccessProfile app1_profile -ClientConsumedCookies
app1_clientconsumed_cookies
add vpn clientlessAccessPolicy app1_access_pol
"http.req.url.path.get(1).eq(\"app1\")"
app1_profile
```

The URLs that are generated while accessing the web application1 and application2 are identified with term: /app1. The policy expressed in the example above may evaluate to true the instances or situations when there is a HTTP request received whose URL path starts with "/app1/". One example of such a HTTP request is "GET/app1/display.asp". Thus, all the cookies for such a request (for application1, or app1) except the cookie named AppClientInfo will be proxied.

In further example, an application 2 uses App2ClientCookie1 and App2ClientCookie2 which may be used on the client side or by the client, but rest of other cookies used by it are not required to be present. Such a configuration might be:

```
add patclass app2_clientconsumed_cookies
bind patclass app2_clientconsumed_cookies App2ClientCookie1
bind patclass app2_clientconsumed_cookies App2ClientCookie2
set vpn clientlessAccessProfile app2_profile -ClientConsumedCookies
app2_clientconsumed_cookies
add vpn clientlessAccessPolicy app2_access_pol
"http.req.hostname.set_text_mode(ignorecase).eq(\"app2\")"
app2_profile
```

In this configuration, application2 (referred as the App2) may be hosted on the web server whose hostname is app2 and thus all the cookies except App2ClientCookie1 and App2ClientCookie2 will be proxied for application2 (App2). In these and similar examples, the administrator may configure the same cookie having name AppClientInfo to be proxied for application2 but not for application1. Similarly, the administrator may configure the cookies having any name or being associated with any service or resource, or any client 102 or server 106 to be proxied or not to be proxied based on such and similar configurations for the policies.

In yet another example, a configuration may set all the cookies for all the sites to be proxied in clientless VPN mode. Client consumed cookies that should not be proxied may be configured by specifying the name of the cookies in the patclass command or instruction. For example, if some application needs two cookies Cookie1 and Cookie2 to be present at the client side, a configuration may be identified as:

```
add patclass app_bypass_cookies
bind patclass app_bypass_cookies Cookie1
bind patclass app_bypass_cookies Cookie2
set vpn clientlessAccessprofile <app_profile> -ClientConsumedCookies
app_bypass_cookies
```

This code for the profile may the be used later in the clientlessAccessPolicy instruction, such as:

add vpn clientlessAccessPolicy<policyName> <rule> <vpnclientlessAccessProfile>

The policy presented above may select the clientless access profile using the clientless access such that all cookies except cookies having name of Cookie1 and Cookie2 will be proxied. Therefore, given set of cookies may not be proxied for a subset of traffic which is identified by the policy rule. The policy rule may be used to select a particular web application or a particular server or a directory on a server. Using configurations similar to the one presented above, different set of cookies may be proxied for different set of users or groups of users or vpn vservers any of which may depend on which entity the configuration of the policy defines or addresses.

G. Systems and Methods for Cookie Proxying in a Multi-Core System

Embodiments of systems and methods for managing cookies between servers and clients in a multi-core system will now be discussed. An appliance 200, as described herein, with multiple cores may receive data for a particular data flow, such as a session, on any of the cores. In some embodiments, each of the multiple cores each having a packet engine may receive requests and responses belonging to the same session. In some embodiments, the requests 810 and responses 820 may be received in sequence. In other embodiments, the requests and responses may be received in parallel. The methods and systems herein may maintain ordering and consistency for cases where multiple parallel responses 820 try to modify the same cookie or multiple requests need to look up the same cookie and provide the most recently set cookie value. The systems and methods herein may use serialization to maintain cookie integrity among the multiple cores of a multi-core intermediary device.

For sessions for which cookie proxying is enabled, the cookies set by the server 106 may be stripped off by the Cookie Proxy 820 executing on the intermediary device 200 at response time and stored in a data structure for cookie storage 825 for the corresponding session. The cookie jar 825 stores the information related to cookies for all the transactions, such as cookie name, value, expiration time. The cookies may be set for a given fully qualified domain name or domain (e.g. mycompany.com or www.mycompany.com) and for a given path, e.g. (/ or /docs/etc). For example, if for the request:

```
GET /docs/index.htm HTTP/1.1
Host: www.mycompany.com
....
Server may send a response of type:-
HTTP/1.1 200 OK
Set-Cookie: Test=test_value; expires=Sat, 10-May-2010 00:00:00 GMT;
path=/docs;
...
```

The Set-Cookie header may be removed and information about the "Test" cookie maybe stored in the cookie jar 825. In some embodiments, the Set-Cookie header sent by the server 106 may not seen by the client 102 unless there is exclusion rule configured. In some embodiments, this operation is known as the "Cookie store and remove" operation.

When a request 106 is sent by the client 102 in the same session, the cookies for given domain/sub domain and path are looked up in the cookie jar 825 associated to the session, and all the valid matching cookies may be inserted in the requests 820 going to the server 102 by a cookie proxy module 820. In some embodiments, this is known as the "Cookie lookup and insert" operation. For example, below is one example of request going out of the intermediary device 200 in which a cookie was inserted by the Cookie Proxy module:—

```
GET /docs/files.html HTTP/1.1
Host: www.mycompany.com
Cookie: Test=test_value;
....
```

Further, some cookies can be generated or modified or deleted by the client side active components like JavaScripts. The intermediary device 200 allows policy driven configuration of the list of cookie names which are allowed to be modified by the clients 102. Set-Cookie headers for those cookies are not removed, and path and or domain components of it are modified, if needed. In all the outgoing responses, a Java Script is inserted which monitors the cookies at the client side and notifies the intermediary device 200 about any modifications in the cookie. The cookie change notification comes with the session cookie and those changes may be done in the cookie jar 825A. In some embodiments, this is known as the "Cookie Update" operation.

Now referring to FIG. 8A, a block diagram representing an embodiment of a system for cookie proxying in a multi-core system is depicted. In brief overview, the multi-core system comprises multiple cores, where each core or processor has a packet engine 848A-848N (collectively referred to as 848). Each processor also may have a cookie proxy 820A-820N (collectively referred to as 820). As in non-multi core systems, the user session data is associated with the processor or co-processor that originally created the sessions, known as the "home processor" or "owner core" or "session-owner." In a multi-core system, subsequent requests in a user session may arrive at a processor or core that is different than the one that created the user session. The processor that receives a request but is not the home processor is known as the "receiving processor" or "non-owner core." The receiving processor does not have access to the user's session data because it exists only in the home processor's address space. To facilitate cookie management, the receiving processor obtains session information from the owner-core.

In brief overview, the system includes an intermediary 200 between a client 102 and a server 106. The intermediary 200 comprises a multi-core system. In some embodiments, a session may be established and maintained by one of a plurality of cores in a multi-core system, such as the first core 805A. This core 805A is sometimes referred to as the owner of the session 805A. The non-owner cores 805B-805N can communicate with the first core 805A and receive information for managing cookies. In view of the cookie management communications and scenarios described in connection with FIGS. 6A-7C, any server communication or client communication may be received on a core different than the core controlling, owning or establishing the session The cores may be assigned a core identifier. The core identifier may be any type or form of alphanumeric identifier or code string. In addition, this core identifier may be unique among the plurality of cores of the multi-core system. The core identifier may be a CPU number of the core, or incorporate the CPU number of the core. A core identifier may be assigned sequentially to each core based on the CPU numbers of the cores. The core identifier can be of any size. In one embodiment, the core identifier is one byte in size. For example, one byte can give 256 (0-255) unique core identifiers.

In further details, the multi-core system may be any of the embodiments of the system 545 described in connection with FIG. 5A and embodiments described elsewhere herein. As such, the multi-core system may be a multi-core device between a plurality of clients and a plurality of service. The multi-core device may provide to the plurality of clients VPN access, such as SSL VPN access, to the plurality of servers. The clients may be on one or more networks, such as public networks, different from the private or internal network of the plurality of servers. Each packet engine on corresponding cores may each provide SSL VPN 280 functionality. With the flow based data parallelism scenario 520, each packet engine/core may receive packets for a data flow assigned to another core. As such, a packet engine/core may receive packets of a server initiated connection managed or assigned to another core.

Each core 805A-805N of the multi-core system can include a cookie proxy 820. and a cookie storage 825. A cookie proxy may comprise hardware or any combination of software and hardware. The cookie proxy may include an application, program, library, script, process, task, thread or any type and form of executable instructions. Although the cookie proxy is illustrated as part the packet engine 848, in some embodiments, the cookie proxy 820 may be a separate component or module of the multi-core system. The cookie proxy may include any of the embodiments of the cookie proxy or cookie manager discussed above in connection with FIGS. 6A-7C.

Each core 805A-805N of the multi-core system can include a cookie storage 825. The cookie storage may include any storage or memory element of the multi-core system for storing cookies. The cookie storage may include any embodiments of the cookie storage described in connection with FIGS. 6A-7C. In some embodiments, each core or packet engine may establish or use a cookie storage. In some embodiments, one or more cores or packet engines may share a cookie storage. In some embodiments, the cookie storage may be distributed among the plurality of cores and packet engines.

The owner core 805 may establish a session between the client 102 and the server 106. The session may be assigned a session identifier which can be any type or form of alphanumeric identifier or code string. A core 805, the backend server 106 or the client 102 may issue the session identifier. The session identifier may uniquely identify the session among a plurality of sessions associated with the multi-core system. A session identifier may be a random 16 or 32 byte value. In one embodiment, the X-OR of the byte[0] with byte[1] location of the session identifier results in a random value. By randomly selecting a one-byte location in the session identifier for encoding the core identifier, such as at system boot time, additional security and randomness with respect to the session identifier may be incorporated. In one embodiment, an SSLv2 session identifier has a size of 16 bytes and the last 4 bytes may contain a time-stamp. In this embodiment, the one-byte location for the core identifier is preferably between byte 0 to byte 11. In another embodiment, a session identifier is 32 bytes for SSLv3 and TLSv1. The lower 4 bytes may be taken up by the timestamp, allowing 28 bytes for encoding a core identifier in SSLv3/TLSv1 protocol. Other than the byte locations reserved for timestamp purposes, the byte location for encoding a core identifier may be selected by any means.

By way of illustration and not limiting in any way, one embodiment of pseudo code for encoding a core identifier may be:

sessionid[0]=coreid;
sessionid[0]^=sessionid[1];

and one embodiment of pseudo code for retrieving the core identifier may be:

coreid=sessionid[0]^ sessionid[1];

In some embodiments, a valid-session identifier is encoded with a core identifier. A valid-session identifier is sometimes referred to as a validity identifier. A valid-session identifier can be a string that identifies a valid session. The intermediary 200 or the multi-core system can determine whether a session is valid. In one embodiment, use of a valid-session identifier helps to filter away random or malicious requests to reuse a session.

The owner core 805 or the packet engine 848 of the owner core may store the session identifier in a session storage of the first core 805A. In one embodiment, the session storage is persistent for the duration that the core 805 is powered up and/or the duration that a session is maintained. In another embodiment, the session storage is persistent even when the core is powered down, or when a session has ended. The session storage can be memory allocated to the core 805 and/or the session. The session storage may be accessed by one or more cores. In some embodiments, the first core maintains and/or updates the session storage. The memory module may include the session storage.

For many embodiments of session on the multi-core device, there is a designated "session owner" packet engine or core which has authoritative control of a given session. The session is usually identified by the session cookie and that cookie has information which packet engine is the session owner. Since a Cookie jar is associated with a session, the session owner packet engine may be chosen as the cookie jar owner. This may help in cases where a session is removed or cookie jar information is updated on the session.

In operation, cookie operations performed at the time of receipt of an HTTP response time may be broken down in to following:—
  1. "Cookie store/update in Cookie jar" which may be performed by the cookie jar owner packet engine; and
  2. "Set-Cookie header removal from response" which may be performed by the packet engine receiving the HTTP traffic Cookie operations that may be performed at the time of receipt of the HTTP request may be broken down in to following:—

3. "Cookie Lookup from Cookie jar" which may be performed by the cookie jar owner packet engine
  4. "Cookie header insertion in request" may be performed by the packet engine receiving HTTP traffic Cookie operations done outside the scope of actual HTTP request/response flow time:—
  5. "Cookie Update in Cookie jar" which may be performed by the cookie jar owner packet engine
  6. "Cookie jar allocation and free" operations which may be performed during session creation/removal time by cookie jar owner packet engine While any packet engine can receive the HTTP traffic, the packet engine does the HTTP request/response modification, namely "Set-Cookie header removal" from HTTP responses and "Cookie header insertion" in HTTP requests. However, the packet engine receiving HTTP traffic uses message passing mechanism such as core-to-core communication to communicate with "cookie jar owner" packet engine and passes all the information for "Cookie store/update in Cookie jar" for HTTP responses and "Cookie Lookup from Cookie jar" to get those operations done if the received packet engine is not the cookie jar owner. If the packet engine receiving the HTTP traffic itself is the cookie jar owner, that packet engine may perform the cookie jar related operations itself without sending any messages.

FIG. 8A also illustrates an HTTP request flow through a multi-core system. An HTTP request 810 arrives on any packet engine in the multi-core system. By way of example, let's assume the request arrives on a non cookie jar owner core. The received packet engine finds out the session owner packet engine/core id from the session cookie, and sends message for cookie lookup for this request to cookie jar owner packet engine. The owner packet engine performs "cookie lookup" operation for the given domain, path and protocol which may be present in the request message and sends the cookies to the requested packet engine as a response. The requesting packet does "Cookie insert" operation on the request header and forwards the request 810' with cookies looked up to the server.

Similarly, when cookie update requests arrive on any packet engine, the received packet engine determines the cookie jar owner packet engine. If the cookie jar owner packet engine is different, the receiving packet engine passes the message to the owner core for "Cookie update in cookie jar" operation. The owner core does the cookie jar operations locally when the owner core receives the messages from other cores or when the owner core directly receives the HTTP traffic.

Figure 8B:
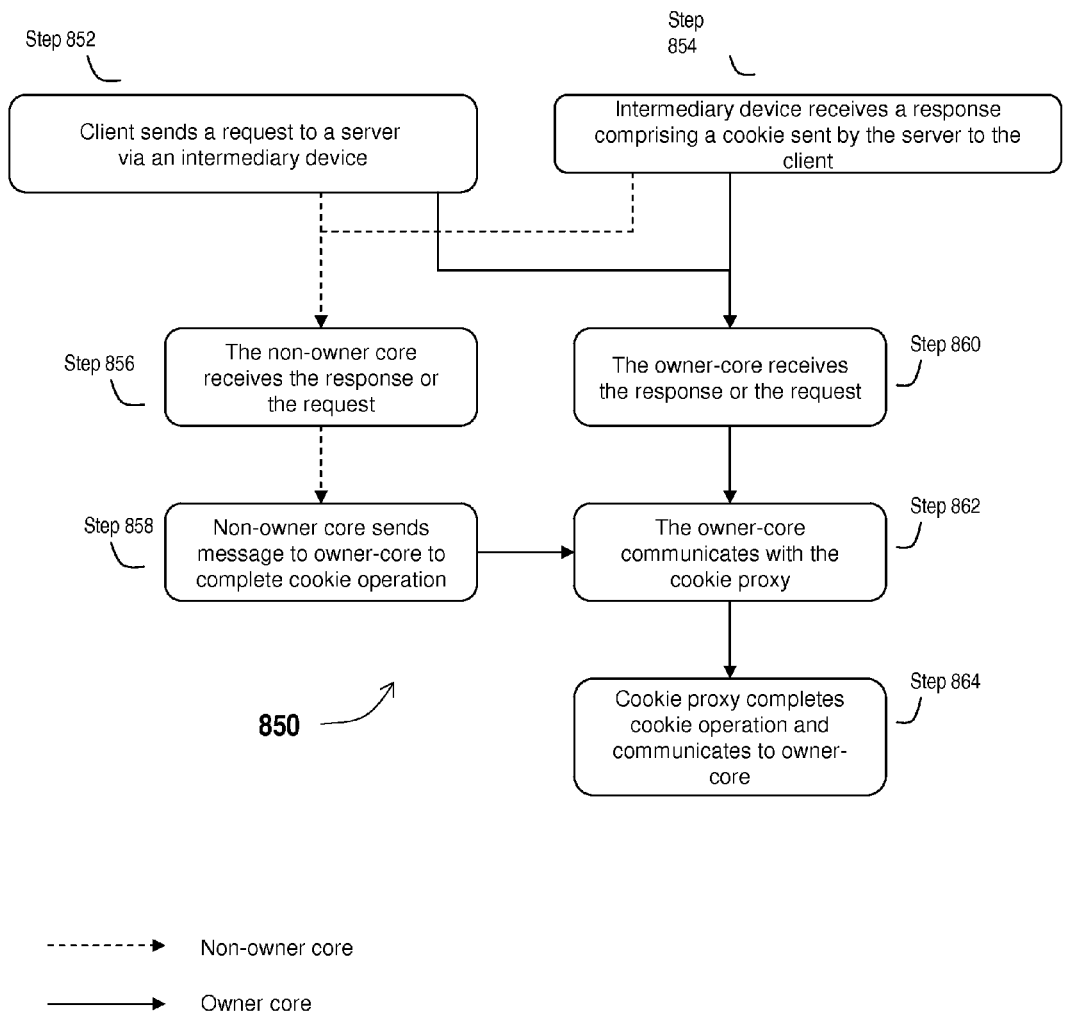
FIG. 8B is a flow diagram of an embodiment of a method for cookie proxying in a multi-core system.

Now referring to FIG. 8B, a flow diagram of an embodiment of steps of a method 800 for cookie proxying in a multi-core system is depicts. In brief overview, at step 852, the client 102 sends a request 810 to a server 106 via an intermediary device 200. At step 854, the intermediary device 200 intercepts a response 820 comprising a cookie sent by the server 106 to the client 102. At step 856, a non-owner core 805B intercepts the response from the server 106. At step 858, the non-owner 805B core sends a message to the owner-core 805A to complete cookie operations. In some embodiments, at step 860, the owner-core 805A intercepts the response 820 from the server 106. At step 862, the owner-core 805A communicates with the cookie proxy 820A. At step 864, the cookie proxy 820A completes the cookie operation and communicates to the owner-core 805A.

Further referring to FIG. 8B, and in more detail, in some embodiments, at step 852 the client 102 sends a request 810 to a server 106 via an intermediary device 200. Any client 102, described herein, can generate the request 810. The request may any type of request. The request may be any type of HTTP request. In some embodiments, a client 102 can initiate or generate a request 810 to access an application, service, resource, webpage or other content on a server 106. The application can be used to create a user-session. The client 102 and sever 106 can communicate over an established connection, such as by TCP/IP. The request can be communicated via a VPN connection or an SSL VPN connection or session.

In some embodiments, any of the cores of the multi-core system can intercept the communications between the client 102 and the server 106. The processing core 505 that intercepts the initial request 810 from the client 102 can be referred to as a home processor. In some embodiments, the processing core 505 that intercepts the initial request 810 from the client 102 can be referred to as the owner-core. In other embodiments, the processing core 505 can be referred to as the session-owner. When the owner-core intercepts the initial request 810, the owner core establishes a user session. In some embodiments, the owner-core creates a session identifier. In still further embodiments, the owner-core embeds or associates the session with the session identifier and stored on the intermediary device 200.

A core 805A can be designated as the "session owner" where the packet engine 848A has authoritative control of a given session. The session is usually identified by a session cookie and that cookie has information which packet engine 848 A is the session owner 805A. A cookie storage 825A mechanism is always associated with a session and the session owner packet engine 848A can be chosen as the cookie storage 825A as well since it helps in cases where session is removed or cookie storage information is updated on the session. In some embodiments, the cookie storage 825A may be known as a cookie jar.

At step 854, the intermediary device 200 intercepts a response comprising a cookie sent by the server 106 to the client 102. Responsive to receiving a client request 810 or 810', the server 106 sends a response 820 back to the client 102. The response 820 may contain resources sent by the server 106 responsive to the request 810. The response 820 may contain the requested resource or content. In other embodiments, the response 820 may contain an error message or other types of response indications. The response may include any one or more cookies.

At step 856, a non-owner core 805B of the intermediary 200 intercepts the response 820 sent by the server 106 to the client 102. In some embodiments, the non-owner core 805B may send a core-to-core message, to the owner-core 805A notifying the owner-core 805A of the response 820 from the server 106. At step 858, the non-owner core 805B may forward the response 820 from the server 106 to the owner-core 805A.

In some embodiments, a non-owner core 805B-805N receives a request 810 from a client 102 containing a session cookie from the client. In some embodiments, the non-owner core 805B-805N determines from the session cookie received from the client 102 the identity of the owner-core. In some embodiments, the non-owner core may intercept a request 810 or response 820 and identify the owner-core 805A using the session identifier. In some embodiments, the non-owner core may send a message to the identified owner-core providing a notification of the request 810. In some embodiments, the non-owner core communicates with the owner-core 805A by sending a third request for or with cookie information for the session based on a domain, path and protocol.

In some embodiments, the non-owner core 805B may message the identified owner-core 805A and the owner-core 805A may message the non-owner core 805B back with instructions to process the transaction (request 810 or response 820). In some embodiments, the owner-core 805A may send to the non-owner core the cookie information for a domain, path and protocol responsive to a message received from the non-owner core. In some embodiments, the non-owner core takes the cookie information received from the owner-core and inserts a second cookie based on the cookie information received from the owner-core 805A. In still other embodiments, the intermediary device 200 forwards the to the server 106 the third request having the second cookie.

In some embodiments, the core or packet engine receiving the HTTP response removes the set-cookie header from the response. The receiving core or packet engine may communicate with the owner core to store the removed cookie in the owner's cookie jar. In some embodiments, the cookie jar owner packet engine performs the storage of the removed cookie to the cookie jar.

At step 860, the owner-core 805A receive the response 820 from the server 106 to the client 102. Since the owner-core 805A established the user session responsive to the initial request 810 from the client 102, there may be no need to message the other cores of the intermediary device. In some embodiments, the owner-core 805A sends a message to the other cores to ensure that another response 820 from the server 106 has not been intercepted by another core.

In some embodiments, the core or packet engine receiving the request performs the a cookie header insertion into the request. The receiving core or packet engine communicates with the owner core to perform a cookie lookup from the cookie jar owner packet engine.

At step 862, the owner-core 805A communicates with the cookie proxy 820A. In some embodiments, the owner-core 805A communicates with the cookie proxy 820A after receiving a message from another core of the intermediary device 200. In other embodiments, the owner-core 805A communicates with the cookie proxy after intercepting the response 820 from the server 106. In some embodiments, the owner-core 805A communicates with the cookie proxy 820A after intercepting the response 820 from the server and after a pre-determined amount of time. In some embodiments, the pre-determined time delay is set by a policy. In other embodiments, the pre-determined time delay is set manually. In other embodiments, the pre-determined time delay is set a manufacture of the intermediary device 200.

At step 864, the cookie proxy 820A completes the cookie operation and communicates to the owner-core 805A. In some embodiments, cookie operations done at the response time may be cookie storage or cookie update in cookie storage, which is completed by the owner-core packet engine 848A. In some embodiments, the owner-core 805A determines to remove the cookie from the intercepted HTTP transaction (either the response 820 or the request 810) responsive to a pre-existing policy for the session. In other embodiments, the owner-core 805A determines to remove the cookie from the intercepted HTTP transaction (either the response 820 or the request 810) responsive to a pre-determined existing policy for the content of the response 820. In some embodiments, the owner-core determines to remove the cookie from the HTTP transaction (either the response 820 or the request 810) responsive to a policy that identifies a pre-determined URL in the response. In some embodiments, the policy specifies a complete URL for. In other embodiments, the policy specifies a partial URL.

In some embodiments, the pre-existing policy is set manually. In other embodiments, the pre-existing policy is set at manufacture. The packet engine 848A strips the cookie from the response and stores the cookie from the response 820 in the cookie storage 825A or cookie jar. If a cookie already exists, the packet engine 848A updates the information stored in the cookie jar with the information received in the newly intercepted cookie. In some embodiments, the cookie operation done when the response 820 is receives is the "set-cookie header removal from response" in which the cookie is stripped from the response by the packet engine that received the response 820. In some embodiments, the cookie operation is completed by the owner session cookie packet engine 848A. In other embodiments, the owner core 805A sends a message to the non-owner core that intercepted the response 820 to complete the removal from response cookie operation.

In some embodiments, cookie operations are completed at the time a request 810 from a client 102 is intercepted. In some embodiments, a "cookie lookup from cookie jar" is completed by the session owner 805A. The packet engine 848A uses the information of the request 810 from the client 102 to identify the cookie from the cookie storage 825A. In some embodiments, the packet engine 848A of the session owner inserts the cookie into the request 810. In other embodiments, the session owner sends a message to the core 805B-805N that intercepted the request 810 and instructs the core to complete the "cookie header insertion in request" operation.

In some embodiments, the cookie operations are completed outside the scope of a request 810 or response 820. In some embodiments, the cookie operation is a "cookie update in cookie jar" completed by the session-owner packet engine 848A. In some embodiments, a policy instructs the owner-core to run a check on the existing cookies to ensure all the cookies are in valid form. In other embodiments, the policy directs the owner-core packet engine 848A to ensure all cookies do not exceed a predetermined size.

In other embodiments, the cookie operation is a "cookie jar allocation and free" by the session owner packet engine 848A during the session creation or removal. In some embodiments, the cookie operation allocates free memory of the intermediary device 200 to ensure there is enough storage to store received and updated cookies for the session. In other embodiments, the cookie operation expunges all the existing cookies once the session is terminated. In some embodiments, a policy specifies that the cookie jar should not be expunged for a pre-determined amount of time. In other embodiments, a policy specifies that the cookie jar should only be partially expunged. In other embodiments, a policy specifies that all the cookies be copied to a central cookie jar. In other embodiments, a policy specifies that a log be created for all cookie operations, such as timestamps, ip addresses from the device sending or requesting the cookie, any cookie updates, deletions, or creations.

In some embodiments, the cookie operation may be setting a cookie for a given domain or sub-domain. In other embodiments, the cookie operation may be stripping the cookie from the response 820 sent by the server 106 prior to sending the response to the client 102. The cookies stripped from the response 820 may be stored in cookie storage 825A. The cookie storage may be on the intermediary device 200. In other embodiments, the cookie storage may be on a different device. In still other embodiments, the cookie storage may be in a database, table, or data structure stored in the owner-core. In other embodiments, the cookie storage may be stored on the intermediary device 200 and accessed by any of the cores of the device 200. In other embodiments, the cookie storage may be known as a cookie jar.

In some embodiments, the cookie store and update operations are done locally on each core of the intermediary device 200 by the receiving packet engine without sending a message to the owner packet engine 848A. The non-owner core 848B-848N receives the request 810 or response 820 obtains a local copy of the cookie storage 825A from the owner core 805A if the non-owner core does not already have a locally stored copy. The owner-core packet engine 848A proceeds to broadcast all updates or modifications to the cookie storage 825A to all the packet engines 848B-848N that have a copy of the cookie storage 825A. The broadcast of modifications to the cookie storage 825A by the owner-core packet engine 848A may utilize Lamport timestamps, vector clocks, version vectors, matrix clocks, or any combination of serialization mechanisms described herein.

In some embodiments, sessions of an owner core 805A may be replicated to all the packet engines 848B-848N of the intermediary device 200. When a request from a client 102 is intercepted, then a cookie lookup or cookie update operations can be completed locally on the receiving non-owner packet engine 848B-848N. Once the cookie lookup or cookie update operation is completed locally, the changes are broadcast to the other cores of the device 200 including the owner-core 805A. In some embodiments, the broadcasting of updates or changes to the cookies are serialized. In some embodiments, the serialization mechanism may be by Lamport timestamps. In other embodiments, the serialization mechanism may be by vector clock. In other embodiments, the serialized broadcast mechanism may utilize version vectors, matrix clocks, or any combination of serialization mechanisms.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method for managing cookies by a multi-core device intermediary to a client and one or more servers, the method comprising:
   (a) receiving, by a first core of a multi-core device intermediary to a client and one or more servers, via a session, a response from a server to a first request of the client, the response comprising a cookie;
   (b) removing, by the first core, the cookie from the response;
   (c) storing, by the first core, the cookie in a corresponding storage for the session;
   (d) forwarding, by the first core, the response without the cookie to the client;
   (e) receiving, by a second core of the multi-core device, via the session a second request from the client;
   (f) determining, by the second core from the second request, identification of the first core as owner of the session; and
   (g) communicating, by the second core to the first core, a third request for cookie information for the session.

2. The method of claim 1, wherein step (b) further comprising determining, by the first core, to remove the cookie in response to a policy for one of the session or content of the response.

3. The method of claim 1, wherein step (b) further comprises determining, by the first core, to remove the cookie responsive to identifying a predetermined URL in the response.

4. The method of claim 1, wherein step (e) further comprises receiving, by the second core, a session cookie from the client.

5. The method of claim 4, wherein step (f) further comprises determining, by the second core, the owner of the session from the session cookie.

6. The method of claim 5, wherein step (f) further comprises determining, by the second core, the owner of the session from a session identifier.

7. The method of claim 1, wherein step (g) further comprises communicating, by the second core to the first core, the third request for cookie information for the session based on a domain, path and protocol.

8. The method of claim 1, further comprising receiving, by the second core from the first core, cookie information for a domain, path and protocol.

9. The method of claim 1, further comprising inserting, by the second core, into the third request a second cookie based on the cookie information received from the first core.

10. The method of claim 9, forwarding, by the device to a server of the one or more servers, the third request having the second cookie.

11. A system for managing cookies by a multi-core device intermediary to a client and one or more servers, the system comprising:
- a multi-core device intermediary to a client and one or more servers, each core of the multi-core device executing a packet engine;
- a first core of the multi-core device receiving via a session a response from a server to a first request of the client, the response comprising a cookie;
- a first packet engine of the first core removing the cookie from the response, storing the cookie in a corresponding storage for the session, and forwarding the response without the cookie to the client;
- a second core of the multi-core device receiving via the session a second request from the client; and
- a second packet engine of the second core determining from the second request, identification of the first core as owner of the session and communicating to the first core a third request for cookie information for the session.

12. The system of claim 11, wherein the first packet engine removes the cookie in response to a policy for one of the session or content of the response.

13. The system of claim 11, wherein the first packet engine determines to remove the cookie based on identifying a predetermined URL in the response.

14. The system of claim 11, wherein the second core receives a session cookie from the client.

15. The system of claim 14, wherein the second packet engine determines the owner of the session from the session cookie.

16. The system of claim 15, wherein the second packet engine determines the owner of the session from a session identifier.

17. The system of claim 11, wherein the second packet engine communicates to the first core, the third request for cookie information for the session based on a domain, path and protocol.

18. The system of claim 11, wherein the second packet engine receives from the first core cookie information for a domain, path and protocol.

19. The system of claim 11, wherein the second packet engine inserts into the third request a second cookie based on the cookie information received from the first core.

20. The system of claim 11, wherein the second packet engine forwards to a server of the one or more servers, the third request having the second cookie.

* * * * *